Oct. 15, 1963 D. P. DARWIN ET AL 3,107,346

DATA STORAGE APPARATUS

Filed Nov. 4, 1957 14 Sheets-Sheet 1

*INVENTORS*
DANIEL P. DARWIN
DONALD K. REX
ROBERT M. KELLOGG
*BY* Donald F. Voss
ATTORNEY Oct. 15, 1963 D. P. DARWIN ETAL 3,107,346

DATA STORAGE APPARATUS

Filed Nov. 4, 1957 14 Sheets-Sheet 3

Oct. 15, 1963 D. P. DARWIN ETAL 3,107,346

DATA STORAGE APPARATUS

Filed Nov. 4, 1957 14 Sheets-Sheet 7

Oct. 15, 1963 D. P. DARWIN ETAL 3,107,346

DATA STORAGE APPARATUS

Filed Nov. 4, 1957 14 Sheets-Sheet 8

Oct. 15, 1963 D. P. DARWIN ET AL 3,107,346

DATA STORAGE APPARATUS

Filed Nov. 4, 1957 14 Sheets-Sheet 9

Oct. 15, 1963 D. P. DARWIN ET AL 3,107,346

DATA STORAGE APPARATUS

Filed Nov. 4, 1957 14 Sheets-Sheet 10

Oct. 15, 1963 D. P. DARWIN ETAL 3,107,346

DATA STORAGE APPARATUS

Filed Nov. 4, 1957 14 Sheets-Sheet 14

3,107,346

DATA STORAGE APPARATUS

Daniel P. Darwin, Endicott, and Donald K. Rex and Robert M. Kellogg, Binghamton, N.Y., assignors to International Business Machines Corporation, New York, N.Y., a corporation of New York Filed Nov. 4, 1957, Ser. No. 694,388
44 Claims. (Cl. 340—174.1)

This invention relates to data storing apparatus and more particularly to data storing apparatus of the random access type.

Previously suggested data storage systems disclose various means for storing a large number of data records and access to the data records may be accomplished in any one of several ways. Examples illustrating some of these means for storing data on records include magnetic recording of information in coded form upon rotating drums, rotating discs, magnetic tapes, and magnetic wires. These devices usually provide a transducer or transducers to coact with the record medium to selectively read or erase information and record new information. Of course, the particular manner in which the information is stored and the method for gaining access to the information subsequent to storage are the determining factors as to the effectiveness of the storage system.

While large quantities of data may be recorded on any particular record, to realize optimum storage of data, it is necessary that the records be stored compactly, and further, any one of the stored records must be available to a data recording and reading means at a rapid rate.

Obviously, a low capacity storage system could be devised with a small access time and conversely, a very high capacity storage system could be made with a large access time, or a very high capacity storage with relatively small access time could be made which would require so many components that it would be impractical to have such a storage device in view of cost and size.

Accordingly, it is here a primary concern to provide a means for storing a very large number of data records in the smallest possible volume and for gaining access to any particular data record at a very rapid rate which may be considered as immediate access to the information. The time interval between the instant at which the information is requested of the memory device and the instant at which the information is available is the access time for the memory device. The record may be moved relative to a transducer or the transducer may be moved relative to the record, again the particular method used will determine the effectiveness of the storage system.

As an example in this invention, the memory device has a capacity for forty-two million magnetic bits of information with an average access time of about one hundred fifty milli-seconds. The dimensions of the storage device itself are approximately three inches by three inches by thirty inches. The information may be recorded on tubular or wire record elements by well-known recording techniques. The uinque manner for storing a large number of data recordings in this invention consists of providing a plurality of parallely arranged intersupported longitudinal tubes each freely containing a wire therein on which coded information is recorded. Each wire includes a data bearing portion and a nondata bearing portion and a wire is selectively projected from its related tube to a translating means for moving the projected wire relative to a data reading and recording means or transducing means. Only the data bearing portion of each wire encounters the transducing means and the wire is returned to be contained within its related tube before entire nondata bearing portion of the wire leaves the tube. The coded data is recorded in discrete positions on the record elements; hence the record elements may be moved from the tubes relative to the transducing means in such manner that when a particular predetermined discrete position has passed the transducing means, the record elements will be automatically retracted into the tubes.

Further, the transducing means operate while the record element is being projected from its tube rather than first removing the record element and then performing the transducing operation. The transducing means and the record elements bear relationship to each other in that the transducing means may accommodate all of the record elements for performing a transducing operation without being accurately aligned with any particular record element since the record elements which are freely supported may easily be guided to the transducer. Heretofore, in known large capacity storage devices of the random access type, mechanism was required for accurately aligning the transducer with the particular record element at each storage position. Further, in the instant invention mechanism is not required to prevent hunting of the transducer as normally required in storage devices wherein the transducer must be accurately positioned.

Automatic selection means are employed to select only the particular record element to be projected from a tube. Heretofore, to gain access to a record element it had been the practice to first move a pluarlity of record elements and then seek the desired record element to read and record information, hence moving more records than really necessary. It is readily seen that such a system requires more mechanism and a greater access time, all of which are quite undesirable.

In the example given, advtnage has been made of the fact that very small tubes are available for containing the wire records and further that fine wires upon which the information may be recorded in coded form by well-known magnetic recording techniques are available as record media to loosely fit within the tubes. Further, the wires may be projected from the tube very rapidly to the transducing means and then retracted to lie within the tube.

From the foregoing it is seen that this invention involves a new basic concept with respect to data storage means heretofore known. An analogy can be made between the invention and the manner in which highly skilled operators would store and select information. Essentially, information is stored in a condensed form in the smallest amount of space possible. The skilled operator addresses the store of information to select and project a particular record bearing the information desired. Subsequent to making the address, the operator reads the desired information and before removing the record entirely from the store but after all the information has been read and any deletions or additions in the information if desired have been made, returns the record to the store.

It is one of the prime objects of the invention to provide a high capacity random access data storage apparatus which permits an over-all increase in speed of operation for both reading and recording operations.

Another object of this invention is to provide an improved memory device of high storage and low volumetric capacity having rapid random access to any storage location.

Another object of this invention is to provide an improved memory device of high storage and low volumetric capacity having a single transducing means to accomodate any storage location for performing a transducing operation with respect to any record element.

Another object of this invention is to provide an improved relatively low-cost memory device of high storage and low volumetric capacity having smaller access time than equivalent type apparatus.

Another object of this invention is to provide an improved selection means for gaining access to any data record at any storage location of a memory device of a high storage and low volumetric capacity.

Another object of this invention is to provide a memory device wherein data is recorded in coded form on records freely contained within the memory device, thereby facilitating easy replacement of any damaged record.

Another object of this invention is to provide a memory device whereby records having coded information recorded thereon in discrete positions are projected therefrom so that a predetermined discrete position passes a transducer and thereafter but before the record leaves the memory device, the record is retracted to lie therein.

Another object of this invention is to provide an improved memory device composed of a plurality of modular units wherein the number of units may be easily increased or decreased at will without appreciably affecting the average access time for the memory device.

Another object of this invention is to provide a high capacity random access data storage apparatus wherein data is stored in coded form on records which can be easily guided from a normal path to a transducer.

Other objects of the invention will be pointed out in the following description and claims and illustrated in the accompanying drawings, which disclose, by way of examples, the principle of the invention and the best mode, which has been contemplated, of applying that principle.

In the drawings:

FIG. 1*a* is a diagrammatic showing to illustrate in simple form one embodiment of the invention with the selection plates aligned.

FIG. 1*b* is a diagrammatic view illustrating movement of the wire relative to the transducer with the selection plates not aligned or in the home position.

FIG. 1*c* is a diagrammatic view illustrating the return of the wire into its related tube with the selection plates in the home position.

FIG. 1*d* is a diagrammatic view illustrating the relative position of the wire within its related tube.

FIGS. 2*a* and 2*b*, with FIG. 2*b* disposed to the right of FIG. 2*a*, constitute a side elevational view of the embodiment of the invention illustrated diagrammatically in FIG. 1*a*.

FIGS. 3*a* and 3*b*, with FIG. 3*b* disposed to the right of FIG. 3*a*, constitute a plan view of the apparatus shown in FIGS. 2*a* and 2*b*.

FIG. 4 is a detail view of a group of tubes forming part of the matrix utilized to retain the data storing wires.

FIG. 4*a* is a detail view of the supports for the groups of tubes.

Figure 11A:
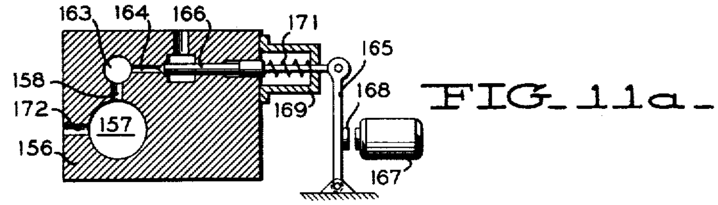
FIG. 11 is a detail longitudinal sectional view of the feed roller positioning mechanism.
Figure 11:
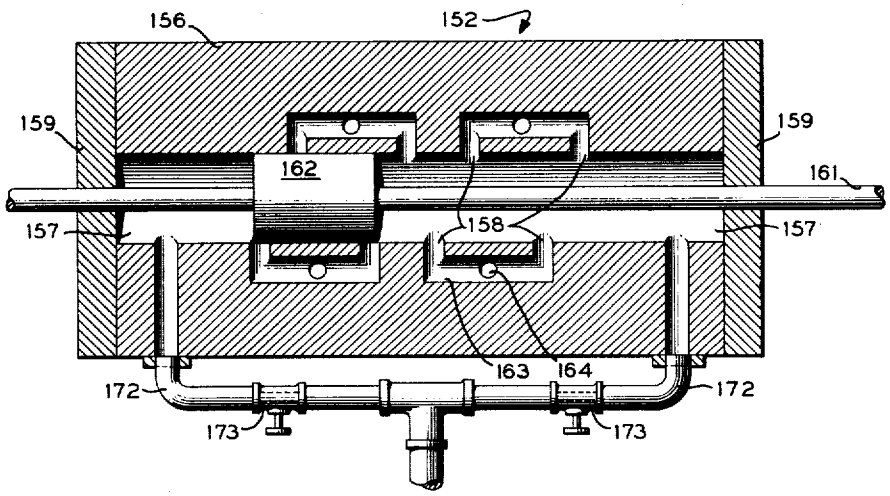

FIG. 11*a* is a schematic sectional view of one of the control valves for the positioning mechanism in FIG. 11.

Figure 12:
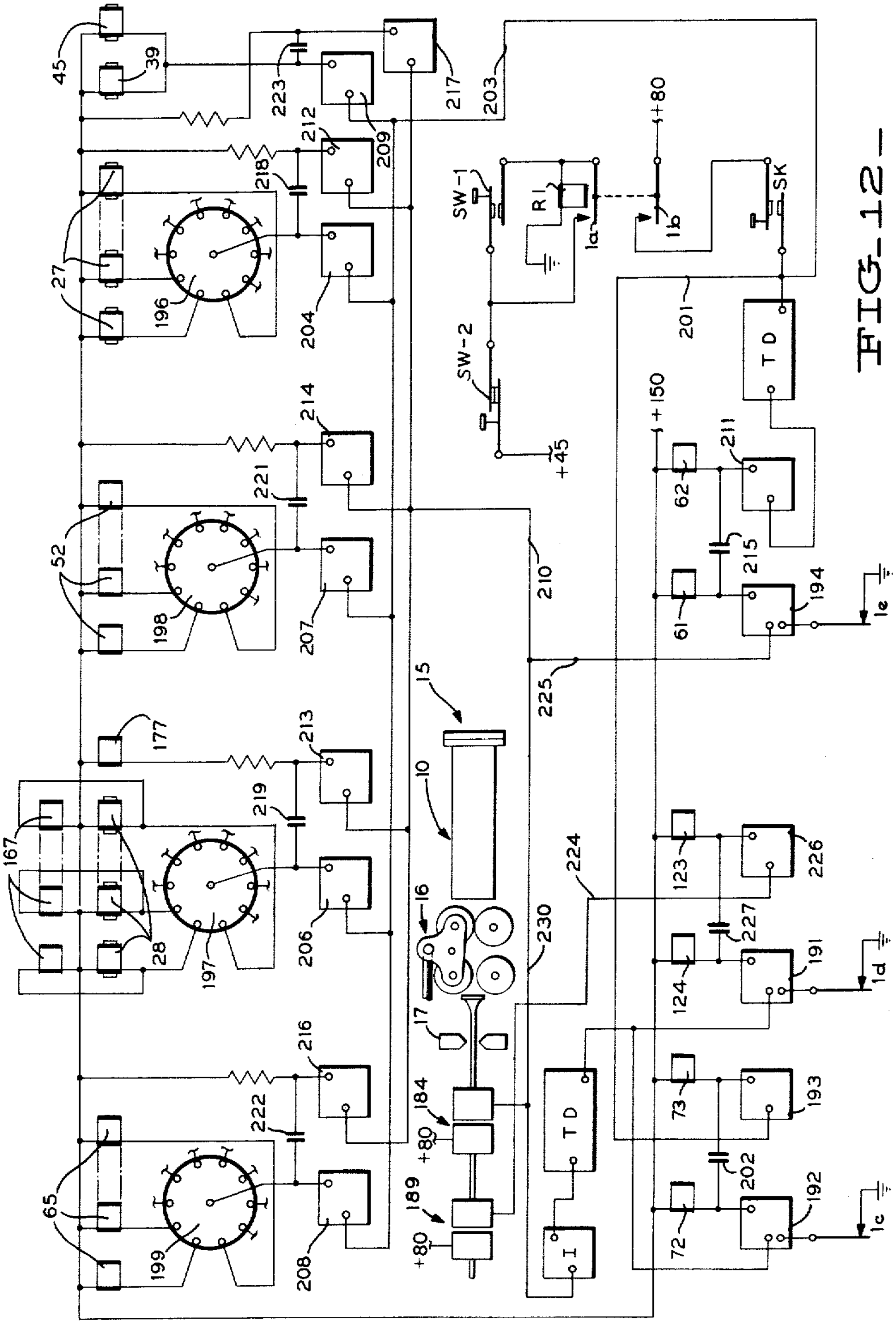

FIG. 12 is a schematic electrical circuit diagram for controlling the operation of the random access storage device.

Figure 13:
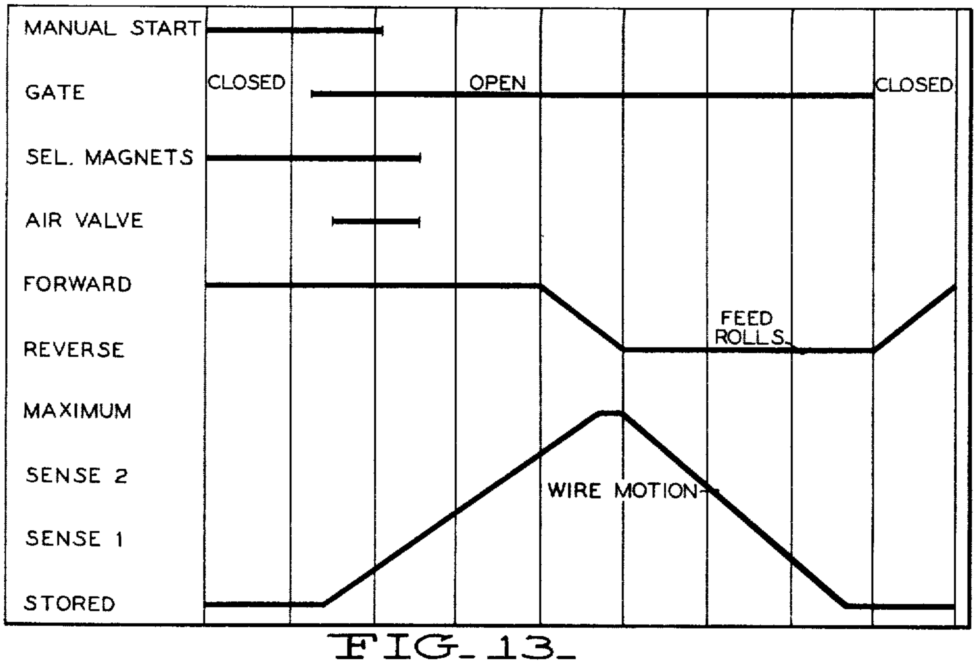

FIG. 13 is a timing diagram showing the sequence of operation of the various elements to cause a wire feeding and return operation.

Figure 14:
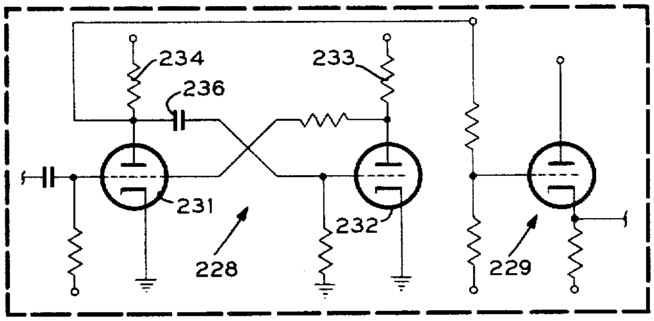

FIG. 14 is an electrical circuit diagram of the time delay circuit shown in block form in FIG. 12.

Figure 15:
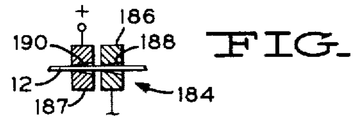

FIG. 15 is a schematic showing of a sensing device for detecting the presence and absence of the forward end of a wire.

Referring now to the drawings, the invention has been illustrated by way of example in FIGS. 2*a*, 2*b*, 3*a*, 3*b* and 5 as a matrix 10 which comprises a plurality of longitudinal cells or tubes 11 arranged in horizontal rows and vertical columns. In the example given a total of ten thousand tubes are provided wherein each tube freely contains a record element or wire 12 for storing data therealong. It is essential in all embodiments of the invention that the records containing the data to be stored are freely supported.

Figure 3A:
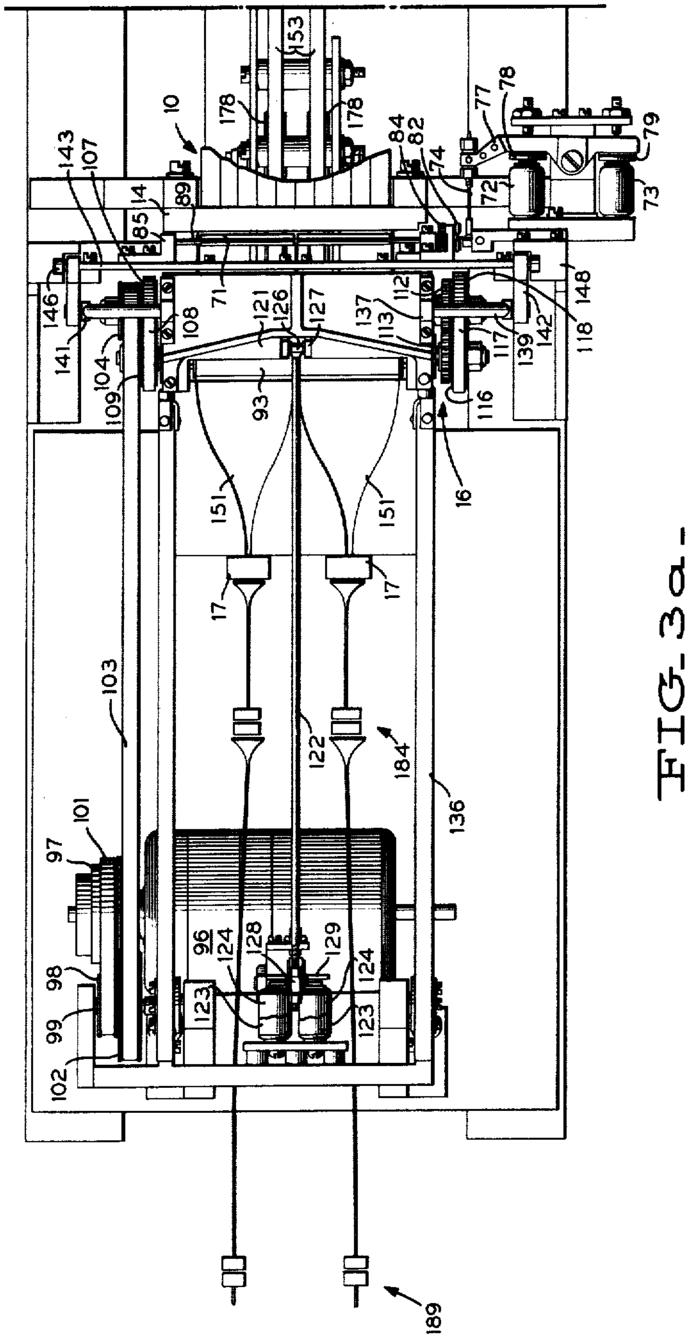
Figure 3B:
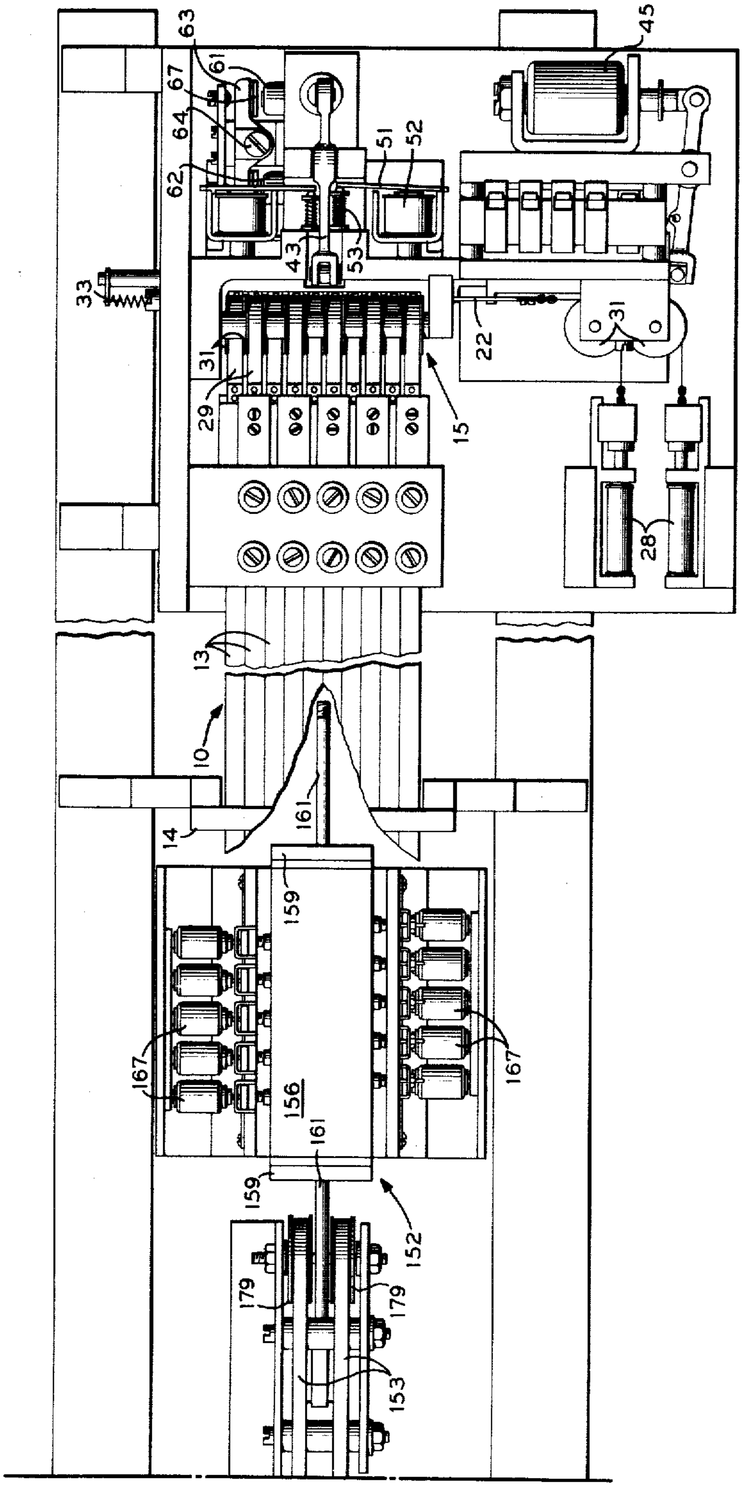
Figure 4:
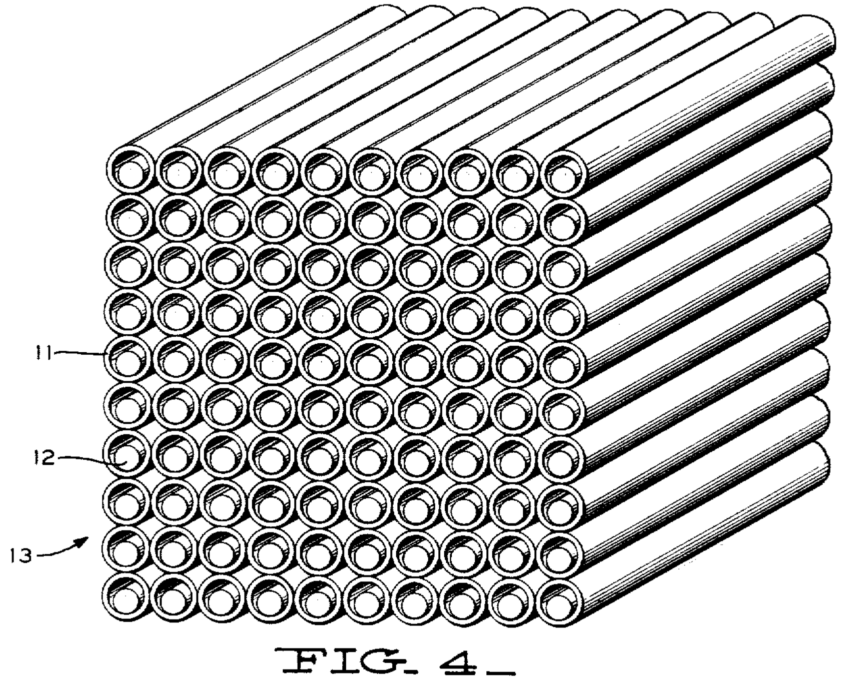
Figure 4A:
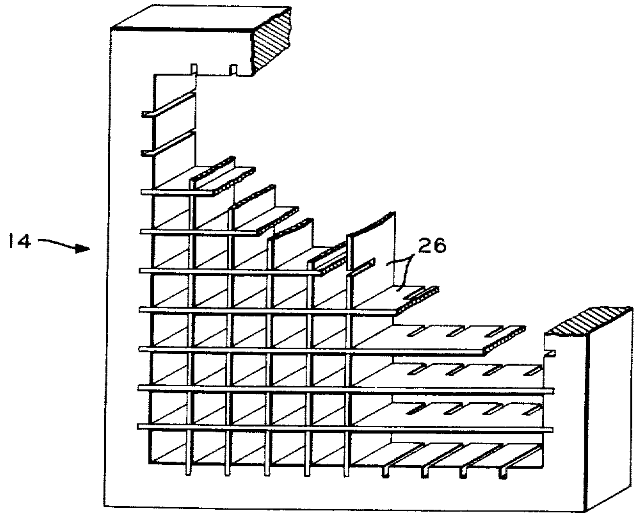

The tubes are arranged in groups 13 with one hundred tubes to a group as shown in FIG. 4. The groups of tubes 13 are formed by successively soldering or otherwise securing ten tubes in a row ten rows high to form a ten by ten matrix of tubes. There are one hundred groups of tubes 13 to provide support for the ten thousand wires in this example. The groups of tubes 13 are arranged in ten horizontal rows and vertical columns with ten groups in each row and column as shown in FIGS. 2*a*, 2*b*, 3*a*, 3*b* and 5. The groups of tubes 13 are individually supported by egg crate type of structures 14, shown in detail in FIG. 4*a*, longitudinally spaced along the length of the tubes.

The tubes in this example having a .016 inch inside diameter and being thirty inches long are fixed on .030 inch centers. The wires freely contained within the tubes are .009 inch in diameter and approximately twenty-eight inches long. The tubes 11 are longer than the wires 12 to permit the wires to be arrested therewithin in a manner described hereinafter. Also in this example, approximately twenty-one inches of the wire may provide the data bearing portion with a bit density of two hundred bits per inch. Thus with 10,000 wires storage is provided for forty-two million bits of information. The remaining seven inches of wire facilitate passage of the data bearing portion past the transducer without the wire 12 leaving its related tube 11.

In order to gain access to the data stored, the wires 12 are selectively projected from the tubes 11 by a wire selecting and projecting mechanism 15 to a translating or feeding mechanism 16 which feeds the wires past a transducer 17, FIGS. 2*a*, 2*b*, 3*a*, 3*b*, 6 and 9. The wire projecting mechanism 15 for selectively projecting a wire 12 from its related tube 11 is located adjacent one end of the groups of tubes 13, the feeding mechanism 16 is located adjacent the other end of the group of tubes 13 and the transducer 17 is located adjacent the feeding mechanism 16.

Figure 5:
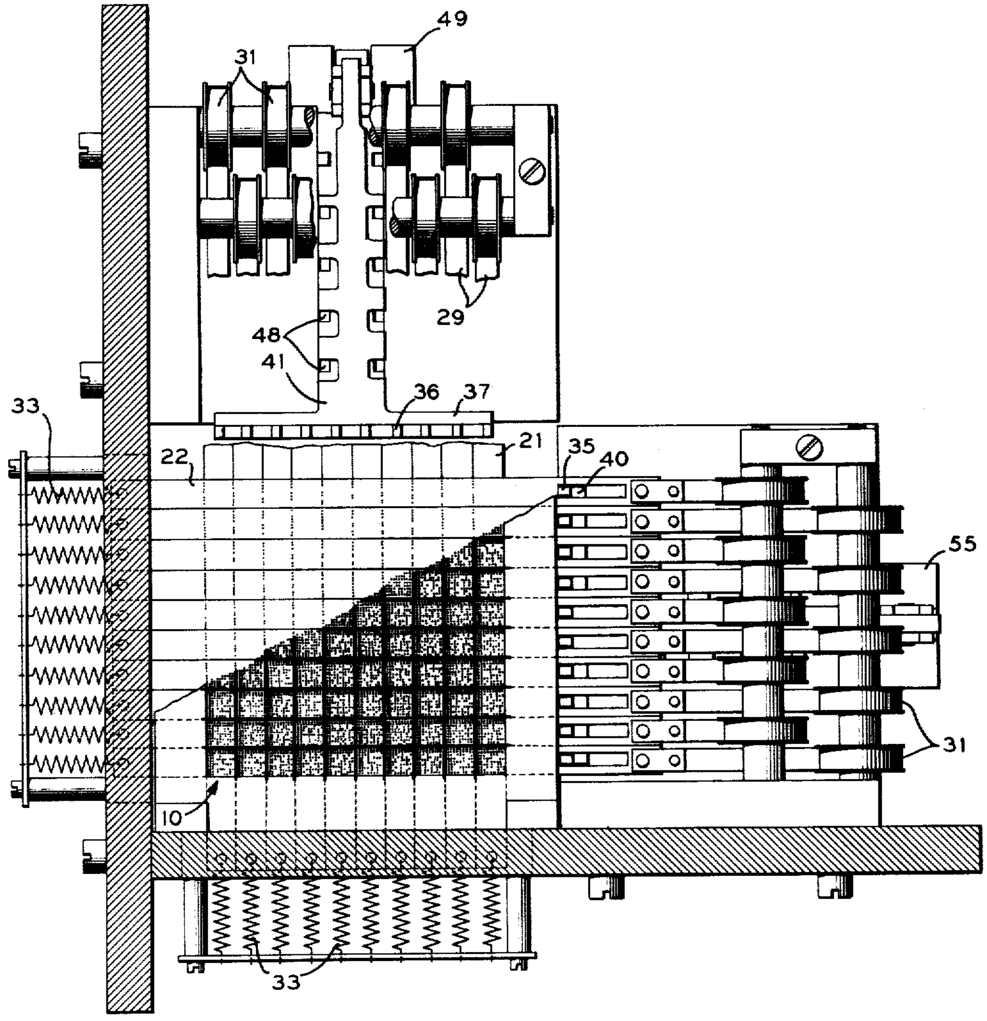
FIG. 5 is a vertical sectional view taken along the line 5—5 in FIG. 2*b*.
Figure 6:
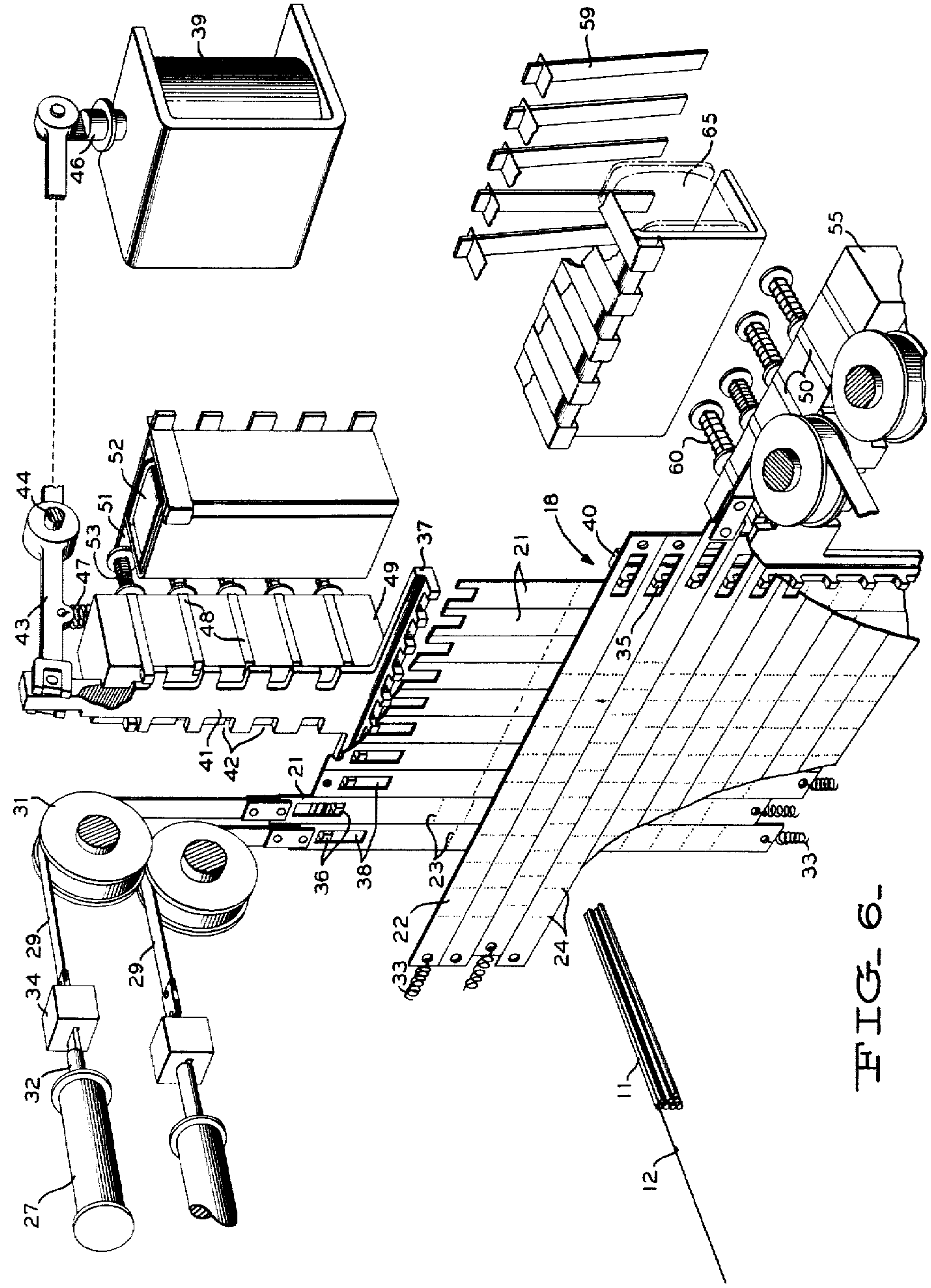
FIG. 6 is a schematic perspective representation of the wire selection mechanism.

The wire selecting and projecting mechanism 15, FIGS. 5 and 6, comprises ten identical selection plates 21 slidably supported with respect to each other in the vertical direction and ten identical selection plates 22 slidably supported with respect to each other in the horizontal direction. The edges of the vertical selection plates 21 are contiguous with respect to each other as are the edges of the horizontal selection plates 22 and the plates 21 and 22 lie in positions corresponding to the columns and rows of the groups of tubes 13, respectively.

Figure 10:
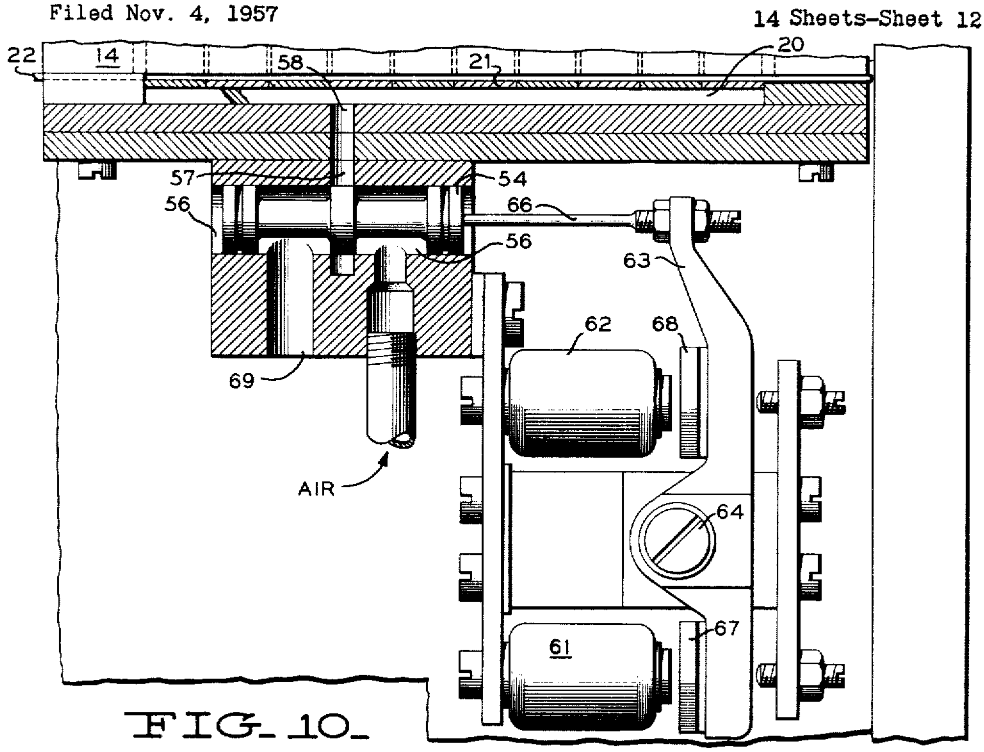
FIG. 10 is a detail partial sectional view of the valve mechanism and plenum chamber.

Either the vertical or horizontal selection plates could have one of their faces contiguous with the tube openings adjacent thereto and, in FIGS. 5 and 10, one of the faces of the horizontal selection plates 22 are in contact with the adjacent tube openings and the other face of the horizontal selection plates 22 and one of the faces of the vertical selection plates 21 are contiguous with each other and the other faces of the vertical selection plates 21 lie in communication with an air or plenum chamber 20. Each vertical selection plate 21 has ten holes 23, FIGS. 6 and 7, horizontally positioned in line and corresponding to one row of tube openings in one group of tubes 13 for each group of tubes 13 in the vertical direction or in other words ten vertically spaced rows of ten horizontally positioned holes. Each horizontal selection plate 22 has ten holes 24 vertically positioned in line and corresponding to one column of tube openings in one group of tubes 13 for each group of tubes 13 in the horizontal direction, or in other words ten horizontally spaced columns of ten vertically positioned holes. Hence the vertical plates 21 are adaptable to perform row selection and the horizontal plates 22 are adaptable to perform column selection and the terms row and column will be used hereinafter.

Figure 7:
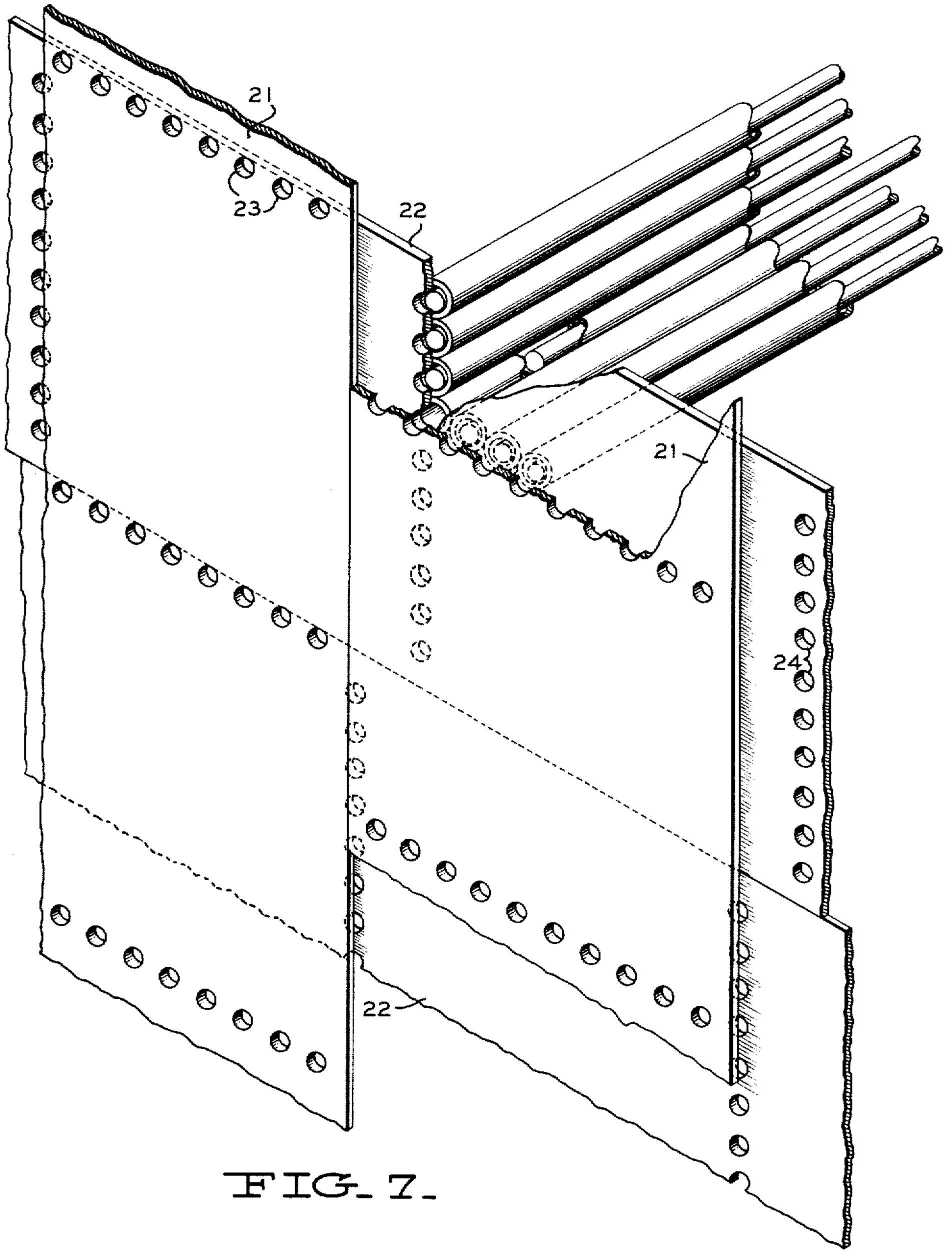
FIG. 7 is a partial detail view to illustrate the manner in which the actuated selection plates provide a through passageway to only one tube opening.

The holes 23 in the row selection plates 21 and the holes 24 in the column selection plates 22 normally lie in register with the horizontal and vertical ribs 26, respectively, of the egg crate structure 14 supporting the groups of tubes 13 and this condition is considered a home position for the selection plates. Hence by moving a row selection plate 21 and column selection plate 22, it is possible to align the plates with respect to each other so that only a selected tube opening is exposed to the plenum chamber 20. FIGS. 6 and 7 illustrates how a selection may be made for a particular tube.

The movement of the row selection plates 21 is under control of groups of solenoids 27 and movement of column selection plates 22 is under the control of solenoids 28. The mechanism involved for movement of the column selection plates 22 is identical to that for the row selection plates 21, hence only the mechanism for operating the row selection plates 21 will be described in full detail.

There is a solenoid 27 to actuate each selection plate 21. The solenoids 27 are suitably supported in two planes for convenience of accessibility as are the solenoids 28. A flexible band of metal 29 such as spring steel fixedly attached to one end of each selection plate 21, extends over a pulley 31 and has its other end attached to the cores 32 of solenoids 27 as in FIG. 6. The pulleys 31 facilitate the movement of the selection plates 21 in one direction and the application of force for causing their movement in another direction. The selection plates 21 are normally biased to the home position by springs 33 secured to the other end of the selection plates. Each plate 21 is located in the home position by a stop block or abutment 34 which is engaged by the core 32 urged thereagainst by the spring 33 when the solenoid 27 is de-energized.

The distance that any selection plate 21 moves is determined by the particular location of a related stop pin or projection 36 carried on a longitudinal bail bar 37. Similarly the distance that the selection plates 22 move upon energization of the solenoids 28 is determined by the position of projections 35 on a bail bar 40. The projections 36 protrude through rectangular slots 38 in the related selection plates 21. Movement of the bail bars 37 and 40 is under control of solenoids 39 and 45; however, the distance of movement of the bail bars 37 and 40 is predeterminable or selectable.

Formed integral with the bail bar 37 and at right angles thereto is a comb bar 41 having a total of ten notches 42, five on each side, and each notch increasing in length a fixed amount over the preceding notch. The comb bar 41 is attached at its upper end to one end of a rocker arm 43 pivotally supported intermediate its ends by a pin 44. The other end of the rocker arm 43 is attached to a core 46 of the solenoid 39. The rocker arm 43 is biased in a home position by a spring 47 when the solenoid 39 is de-energized. The distance that the bail bars 37 and 40 move when solenoids 39 and 45 are energized is determined by suitably disposed equally spaced stop pins 48 and 50 slidably supported in blocks 49 and 55 and fixed to armatures 51 and 59 of stop pin magnets 52 and 65, respectively. The stop pins normally lie out of the path of movement of the comb bars but are selectively positionable to engage the bottom edges of the notches in the comb bars to selectively locate the position of the projections 36 and 35 and thereby determine the distance that the selection plates 21 and 22 can be moved by the solenoids 27 and 28, respectively. Nine of the stop pins 48 and 50 are positionable, the tenth stop pin being fixed in position as shown in FIG. 6 and normally lying in the path of the bottom edge of the tenth notch in the comb bars 41. The positionable stop pins 48 and 50 are maintained in a home position by springs 53 and 60 when the magnets 52 and 65 are deenergized, respectively.

With a selection having been made, a tube opening is exposed to permit an external force to act upon the selected wire 12 contained therein. In this embodiment pneumatic means are utilized to project the wires 12 from the tubes 11. It has been determined that the pneumatic means or air blast does not necessarily have to impinge upon the center of the wire 12 to obtain good responsive movement of the wire 12 from the tube 11. The phenomenon involved is something other than pure piston action of the air acting upon the end of the wire 12, rather the velocity of the air as the air rushes between the wire and the inside wall of the tube 11 drags the wire 12 out of the tube at a very rapid rate. Of course, storage devices embodying our invention could employ many other ways for projecting the wires from the tubes such as electrical, electromechanical, mechanical, and other fluid methods.

As shown in FIG. 10, air is admitted to the plenum chamber 20 under the control of a slide or spool valve means 54 after a wire selection has been made. The spool valve 54 is slidably mounted in a valve chamber or cylinder 56 to open and close a port 57 to admit air under pressure through a duct 58 to the plenum chamber 20. Movement of the valve 54 is under control of two pairs of air control magnets 61 and 62, respectively, (only one magnet of each pair is shown) which oscillates an arm 63 about a pin 64 to reciprocate the valve 54 through a valve stem 66. The arm 63 carries an armature 67 disposed thereon to be attracted by the pair of magnets 61 and an armature 68 disposed thereon to be attracted by the pair of magnets 62. When the magnets 62 are energized, the magnets 61 are de-energized and thereby cause the arm 63 to pivot about the pin 64 to move the valve 54 to the left to communicate the port 57 with the air supplied under pressure to the cylinder 56. When the magnets 62 are deenergized and the magnets 61 are energized, the valve 54 is moved to the right to communicate the port 57 with a passage 69 to exhaust the plenum chamber 20 to the atmosphere. Under normal conditions, the magnets 61 are energized, thereby holding the valve 54 in the position to connect the plenum chamber 20 to the ambient atmosphere.

Figure 1A:
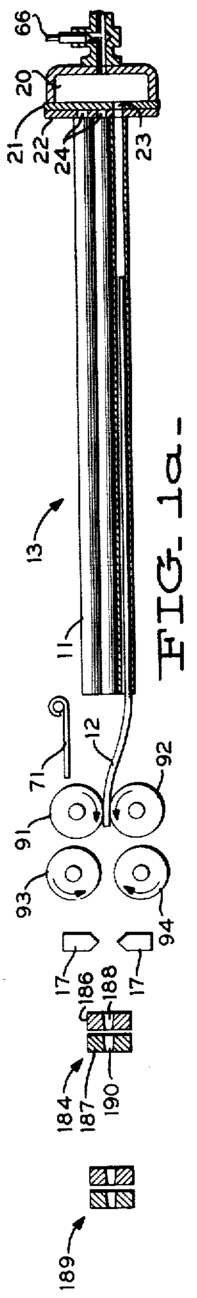
Figure 1B:
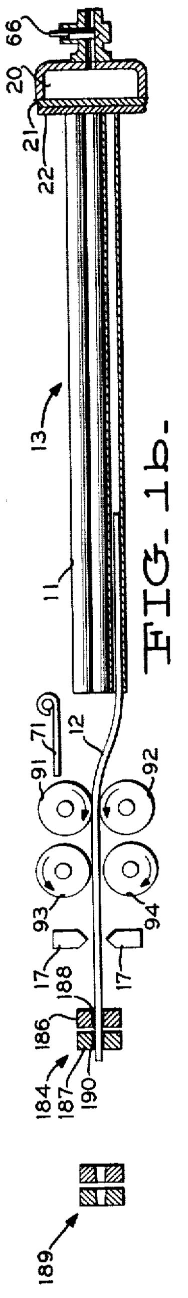
Figure 1C:
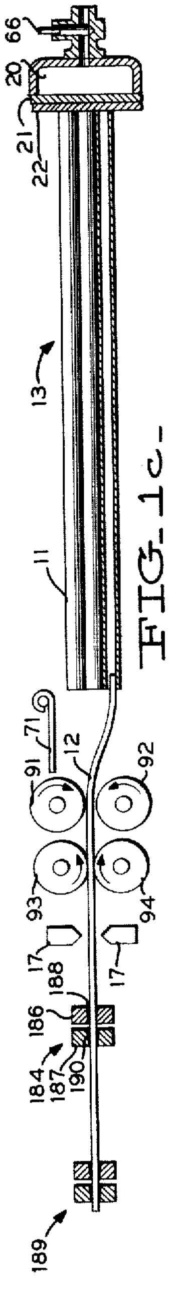
Figure 1D:
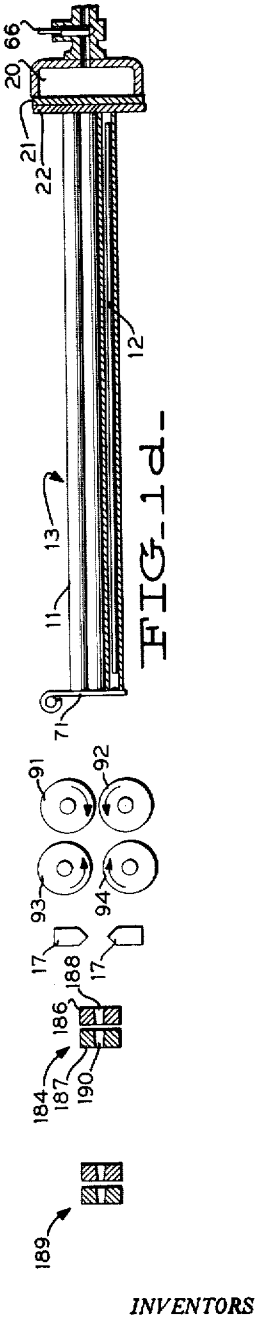

The wires 12 are normally contained in the tubes 11 between the selection plates 21 on one end and a pivotal or swinging gate 71 suitably mounted on the other end as shown diagrammatically in FIG. 1*d*. The gate 71 is pivoted to uncover the tube openings when one of the wires 12 is to be projected from its related tube 11 and to cover the tube openings after the wire 12 has been returned to be within the related tube 11, hence preventing the wire 12 from rebounding out of the tube as it strikes the related selection plate 21 as illustrated in FIGS. 1*b* and 1*c*. Also as previously mentioned, the tubes are somewhat longer than the wires to permit the gate to close before the wire would have a chance to rebound out of its related tube.

Figure 8:
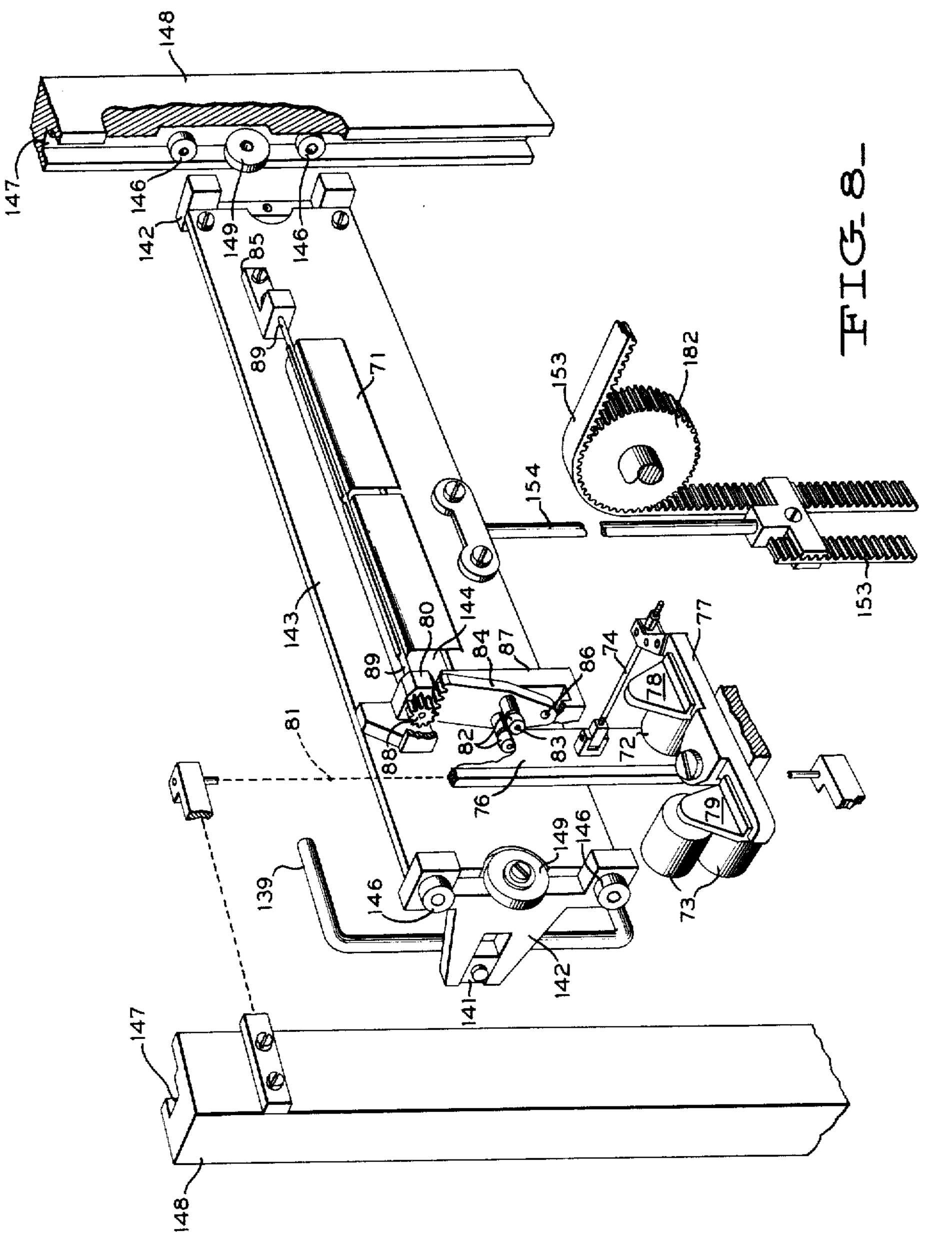
FIG. 8 is a partial view in perspective of the gate mechanism.

Referring to FIG. 8 two pairs of magnets 72 and 73, with one magnet of the pair 72 not shown, are used to operate the gate 71. When the pair of magnets 72 is energized the gate 71 is held in an open position, and when the pair of magnets 73 is energized, the gate 71 is held in a closed position. Specifically, a rod 74 is connected on one end to a vertically positioned rectangular plate 76 and at its other end to an arm 77 pivotally mounted intermediate of its ends and carrying armatures 78 and 79 to be attracted by the pairs of magnets 72 and 73, respectively. The vertical plate 76 pivotally mounted at its ends along one edge of the plate for movement about a vertical axis 81 has its other edge disposed between a pair of spaced rollers 82 mounted on pins 83 fixed to a gear sector 84 mounted to a pivot about a pin 86 fixed in a frame member 87. The gear sector 84 meshes with a gear 88 fixed to one end of a shaft 89 for pivotally mounting the gate 71 for movement about a horizontal axis. This arrangement permits the stationary magnets 72 and 73 to operate the gate 71 about its horizontal axis while the gate 71 is moved to one of the ten vertical positions. The shaft 89 is journaled in blocks 80 and 85 suitably attached to a rectangular plate member 143. The plate 143 has an oblong opening 144 therein in register with the gate 71 to permit wires 12 to pass therethrough.

Figure 9:
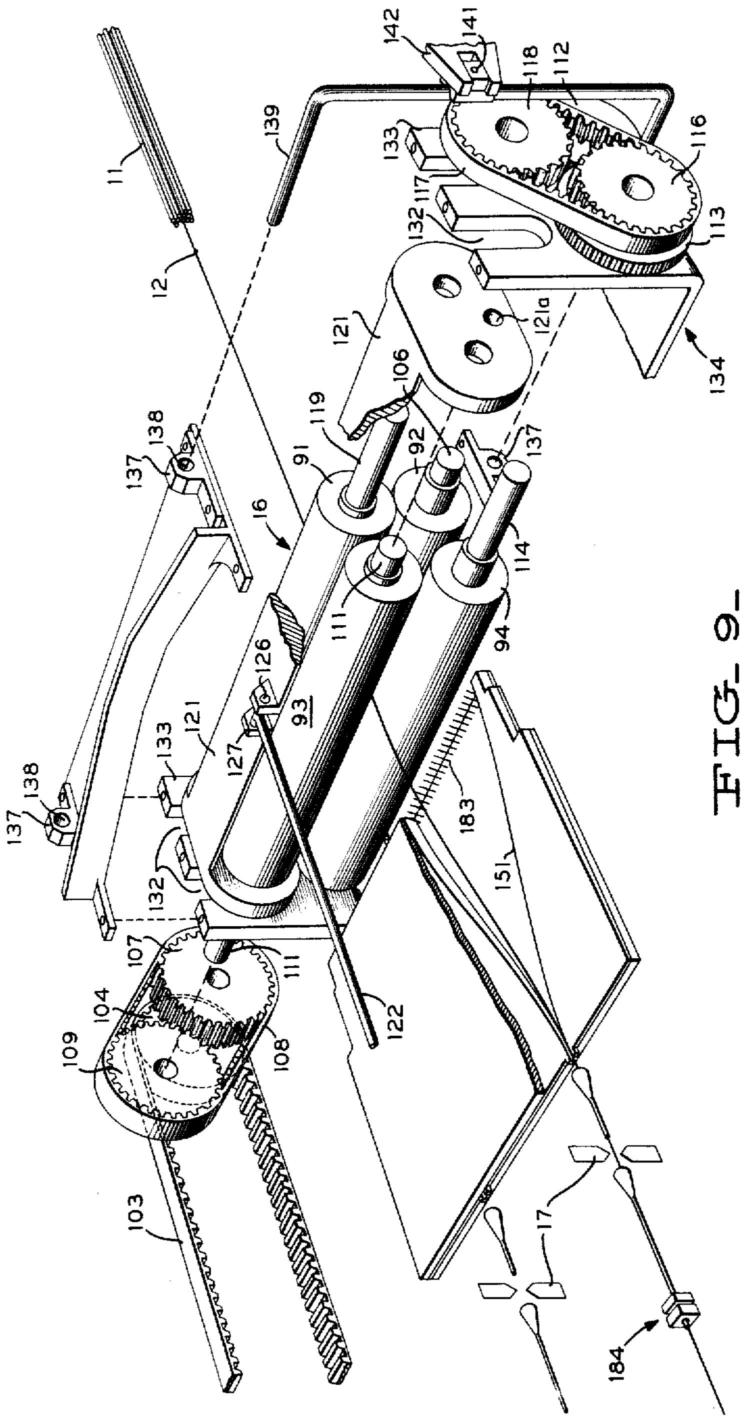
FIG. 9 is an exploded isometric view of the wire feeding mechanism.

With reference to FIG. 9, after a wire 12 has been projected from a tube 11 by the wire selecting and projecting mechanism 15, it passes through the opening 144 to engage the feeding mechanism 16 for feeding the wire 12 relative to the transducers 17 for a transducing operation. The feeding mechanism 16 never completely withdraws a wire 12 from its associated tube 11; a portion of the approximate seven inches of the wire 12 not containing data remains within the tube 11. Furthermore, the feeding mechanism 16 also returns the wire 12 to lie wholly within its related tube 11.

The feeding mechanism 16 comprises a pair of cooperating feed rollers 91 and 92 and a pair of cooperating feed rollers 93 and 94. The pair of feed rollers 91 and 92 is adapted to feed a projected wire 11 forward past the transducer 17 and are termed forward feed rolls whereas the other pair of feed rolls 93 and 94 return the wire 12 for storage within the tube 11 and are termed return feed rolls. The inertia of the moving wire 12 after the feed rollers 93 and 94 have released their control on the wire is utilized to home the wire within its respective tube 11.

Each feed roller of the cooperating pair of feed rollers 91, 92 and 93 and 94 is driven at constant speed, the feed rollers 91 and 93 are selectively positioned to cooperate with the feed rollers 92 and 94, respectively, which are rotating at very high speeds in opposite directions.

Figure 2A:
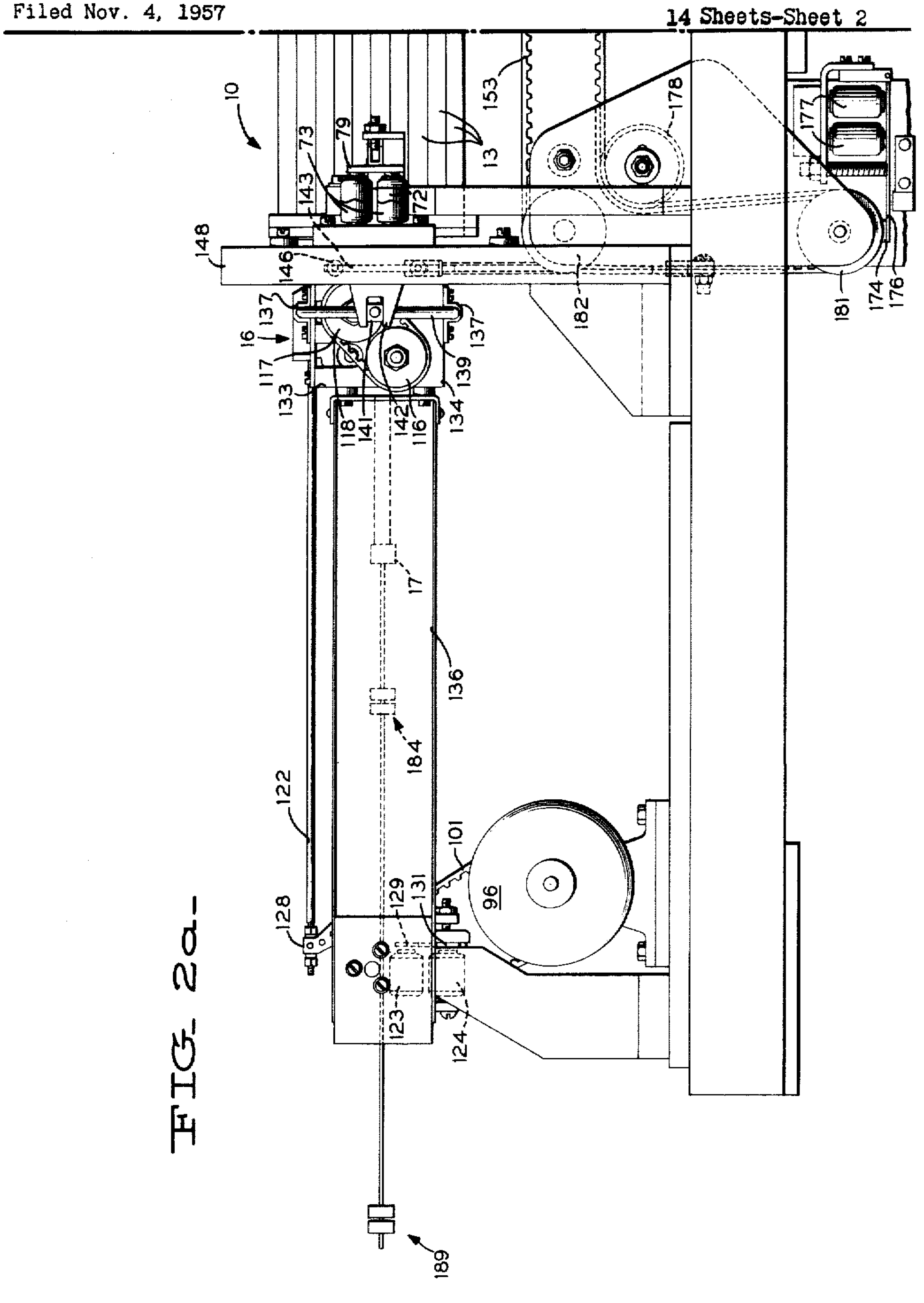
Figure 2B:
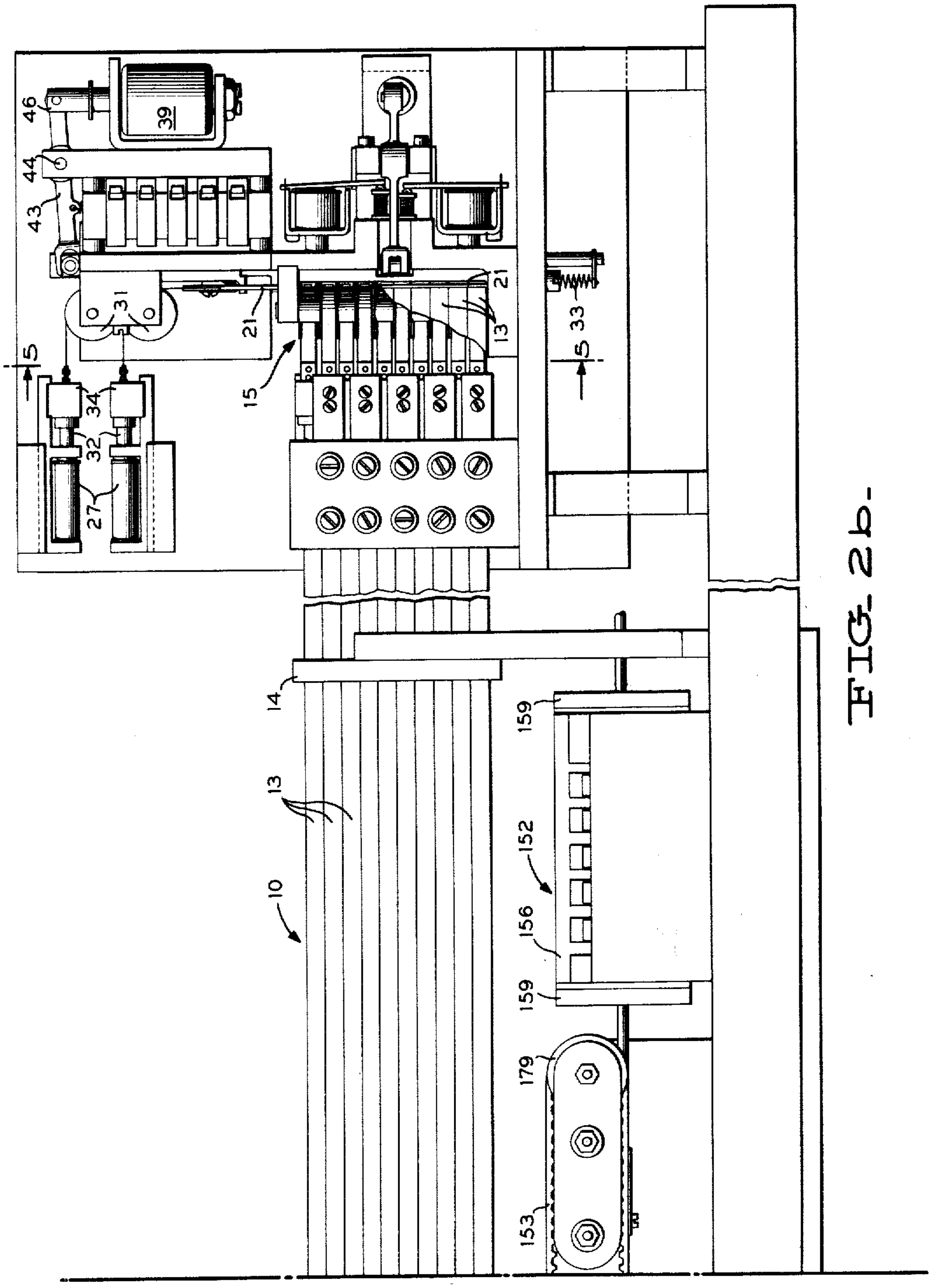

The feed rollers are driven by a motor 96, FIGS. 2*a* and 3*a* having a pulley 97 secured thereto which drives a pulley 98 journaled on a shaft 99 by means of a timing belt 101. A pulley 102 also journaled on the shaft 99 and fixed to the pulley 98 drives the feed roller 92 by means of a timing belt 103 connected about pulleys 102 and 104, the latter being fixed on one end of a shaft 106 for the lower forward feed roller 92. Also attached to the shaft 106, FIG. 9, is a pulley 107 which drives, by means of a belt 108, a pulley 109 secured to one end of a shaft 111 for the upper return feed roll 93. A gear 112 is fixed to the other end of the shaft 106 to be in mesh with a gear 113 fixed to a shaft 114 for mounting the lower return feed roller 94. Further, a pulley 116 is fixed on the shaft 114 adjacent the gear 113 for driving, by means of a belt 117, a pulley 118 fixed to one end of a shaft 119 for the upper forward feed roll 91. Hence it is seen that the rollers 91 and 92 are driven to feed the selected wire 12 forward past one of the transducers 17 and the rollers 93 and 94 return the wire into its related tube 11.

To facilitate alternately engaging and disengaging the forward and return feed rolls, the feed rollers 91 and 93 are journaled in a pivotally mounted yoke member 121, FIG. 9. This yoke 121 is mounted to pivot about pins, not shown, received by holes 121*a* in the ends of the yoke 121. The yoke 121 is selectively pivoted through a connecting rod 122 by means of two pairs of magnets 123 and 124, FIGS. 2*a* and 3*a*, which operate in a manner similar to the pairs of magnets 72 and 73 for opening and closing the gate 71. Again referring to FIGS. 2*a*, 3*a* and 9, the forward end of the rod 122 terminates in a transverse pin 126 which is connected to a lug 127 fixed to the yoke 121 and its other end is secured to an arm 128 pivotally supported intermediate of its ends. The arm 128 carries armatures 129 and 131 to be attracted by the pairs of magnets 123 and 124, respectively. When the pair of magnets 124 is energized the rod 122 is reciprocated to rock the yoke 121 to move the upper forward feed roller 91 into position to cooperate with the lower forward feed roller 92 and when the pair of magnets 123 is energized, the rod 122 is moved in the opposite direction to rock the yoke 121 to move the upper return feed roller 93 into position to cooperate with the lower return feed roller 94.

The shafts 119 and 111 for the feed rollers 91 and 93, respectively, extend through the ends of the yoke 121 and are disposed to lie in U-shaped slots 132 terminating at the edges of parallel laterally spaced side plates 133 of a U-shaped support member 134 fixed to one end of a rectangular frame 136, FIG. 2*a*. The frame 136 is pivotally mounted at its other end thereby permitting vertical movement of the feeding mechanism 16. The shafts 106 and 114 for the feed rollers 92 and 94, respectively, are journaled in the side plates 133 to extend therethrough, FIG. 9. Brackets 137 having holes 138 therein are fixed to the upper and lower ends of each side plate 133. The brackets 137 on each side plate 133 are grouped in pairs to receive U-shaped members 139 having rectangular blocks 141 mounted thereon in a manner to fit into forked members 142 fixed to the ends of the rectangular plate member 143 for mounting the gate 71 as shown in FIGS. 8 and 9. Each forked member 142 carries a pair of rotatably mounted rollers 146 which are adapted to ride in vertical tracks 147 provided in stationary frame members 148, thereby guiding the feeding mechanism 16 as the frame member 136 is pivoted. Rollers 149 also rotatably mounted on the forked members 142 are adapted to ride in the tracks 147 to guide the frame member 136 laterally as it is pivoted and thereby moving the feeding mechanism 16 and the gate 71 vertically.

As mentioned previously, the feeding mechanism together with the gate 71 is positionable in the vertical direction to any one of ten preselected positions to receive and feed wires from any desired position of the storage device. It will be remembered that there are ten groups of tubes 13 arranged in each row and ten of such rows compose the storage device. Since the wires 12 are flexible in all planes transverse to the longitudinal axis, they may be easily guided. Hence for the feeding mechanism to accommodate the various tube locations of each group of tubes 13, it is vertically positioned to the one of ten positions. Each of these positions is preferably located at approximately the mid-position of each of the ten rows of groups of tubes. However, exact positioning of the feeding mechanism 16 at the selected row of groups of tubes is not too critical due to the inherent funneling or guiding characteristics of the peripheral surfaces of the feed rollers which guide a wire to the bite therebetween as seen in FIG. 1*a*.

The feeding mechanism 16 is positioned to one of the ten positions by a feed roller positioning mechanism 152 shown in FIGS. 11 and 11*a*. The feed roller positioning mechanism 152 comprises a casing 156 having a cylinder 157 with ten pairs of ports 158 arranged around its periphery and along its length. Each end of the casing 156 is closed by heads 159 having provisions for guiding a slideable piston rod 161 carrying a piston 162 thereon. The length of the piston 162 is approximately equal to the distance between any pair of interconnecting ports 158. A passage 163 connects each pair of ports 158 and a connecting passage 164 has a valve 166 located therein for controlling communication of the ports 158 with the atmosphere.

Each valve 166 is selectively movable to open and close positions by magnets 167. Armatures 168 are fixed to pivotally mounted arms 165 which are attached at one end to the ends of valve stems 169 for carrying the valves 166. Compression springs 171 urge the valves 166 closed when the magnets 167 are de-energized. Air under pressure is supplied to the cylinder 157 through passages 172 having adjustable orifices 173 therein and leading to the cylinder 157 at equal distances from the heads 159. With the valves 166 closed, the piston 162 is maintained in a balanced condition, since the pressure on each side of the piston 162 is equal. When one of the valves 166 is opened, air entering the cylinder 157 will escape through the certain ports 158 leading to the related connecting passage 163. Under these conditions, the air pressure on one side of one of the orifices 173 will be greater than on the other, the air escaping from the passage 163 and through the passage 164 to the atmosphere creates a reduced force on one side of the piston 162. Hence this unbalanced condition will cause the piston 162 to center between the pair of valve ports 158 where the valve 166 is open to permit air to pass into the connecting passage 164. Once the piston is centered between the related pair of valve ports 158, the valve 166 may be closed and the air pressure equalizes on both sides of the piston 166.

The piston rod 161 could be directly connected to the plate 143 to move the same in vertical direction and thereby pivot the frame member 136 to move the feeding mechanism 16 and the gate 71 to one of the ten positions. However, to satisfy desired geometry of the storage device or in other words to condense the volume of space, occupied by the storage device, the piston rod 161, referring to FIGS. 2*a*, 2*b*, 3*a*, 3*b* and 8, is suitably connected to a pair of laterally spaced endless belts 153 which are guided about a pair of collocating pulleys 179 to be moved longitudinally by the piston rod 161. The belts 153 are further guided by a pair of collocating pulleys 178 to be directed downward in a vertical direction and about a pair of collocating pulleys 181 and then directed vertically upward and over a pair of collocating pulleys 182 to again be directed longitudinally to provide an L-shaped configuration.

The portion of the belts 153 between the pulleys 181 and 182 is suitably connected to a rod 154 fixed to the plate 143. Hence as the piston rod 161 moves with movement of the piston 162, correspondingly the plate 143 is moved by the rod 154, through the belts 153, thereby causing the frame member 136 to pivot and thus vertically position the feeding mechanism 16 approximately to the horizontal axis of one of the ten rows of groups of tubes 13.

A brake shoe 174, FIG. 2*a*, also maintains the piston 162 in a balanced condition. The brake shoe 174 is connected to the end of an armature 176 disposed to be operated by a pair of magnets 177 to move the brake shoe 174 into contact with the endless belts 153 to hold the same stationary between the brake shoe 174 and the pulleys 181. Since the piston rod 161 is attached to the belts 153, the arrestment thereof by the brake 174 holds the piston 162 stationary.

As previously stated the wires are flexible in all planes transverse to the longitudinal axis and therefore may be guided quite easily. Further, it was also pointed out that the feeding mechanism 16 can be positioned to approximately the mid-position of each row of groups of tubes to accommodate or receive any wire selectively projected thereto from any one of the groups of tubes in the particular row since the wire so projected will be guided by the peripheral surfaces of the feed rolls to the bite therebetween. As a wire is fed by the forward feed rolls it can be further guided to one of the transducers 17 and referring to FIGS. 2*a*, 3*a* and 9, two transducers 17 accommodate all of the wires 12 of the storage device. In order to keep the number of transducers at a minimum and at the same time provide optimum operation for a storage system of the size of the disclosed embodiment only two transducers are used as shown. It is possible, however, to embody our invention in a manner that a single stationary transducer would perform the transducing operation with respect to any wire in a storage device. Funneling type of guides 151 are carried by the frame member 136 in alignment with the transducers 17 to direct a wire 12 fed by the forward feed rolls to one of the transducers 17. To guide a wire being returned to its related tube by the return feed rolls, fine pins 183 are vertically mounted on the guides 151 adjacent the return feed rolls. These pins 183 prevent the selected wire 12 from walking across the feed rollers, and thus always insuring return of the wire to the related storage tube along the same path followed during the forward feeding operation.

After the wire 12 passes one of the transducers 17, it enters a first sensing device 184, FIGS. 2*a*, 3*a*, 9 and 15, for detecting the presence of the forward end of the wire 12. Upon sensing the forward end of the wire which is traveling in the forward direction, a signal is generated by the sensing device 184 to permit the actuated wire selection plates 21 and 22 to be restored to a home position and to cause closing of the previously actuated valve 166 associated with the feed roller positioning mechanism 152. The sensing device 184 may be of any suitable form and as shown in FIG. 15 comprises two electrically conductive identically shaped blocks 186 and 187 spaced from each other and having aligned passages 188 and 189 therein, respectively, to permit a wire to pass therethrough. The leading face of each block is countersunk to guide the wire into the passages 188 and 189, respectively. The block 187 is connected to a positive potential as shown in FIG. 15 and when a wire 12 is in both blocks 186 and 187, a circuit is established to transmit a signal. As the wire 12 passes the first sensing device 184 it continues to a second sensing device 189 of identical structure to the first sensing device 184.

The second sensing device 189 is so located outwardly from the transducers 17 that the entire record length of a wire 12 is fed past one of the transducers 17. The signal from the second sensing device 189 is transmitted to operate the magnets 123 and 124 for rocking the yoke 121 to move the upper return feed roller 93 into a cooperative position with the lower return feed roller 94 to return the wire 12 into its associated tube 11 and to move the upper forward feed roller 91 out of cooperation with the lower forward feed roller 92. As the wire 12 returns, the end of the wire again passes the first sensing device 184 to generate a signal to effect disengagement of the return feed rollers and re-engagement of the continuously running forwarded feed rollers, and to close the gate 71 after a short time delay. This permits the wire 12 to leave the feed mechanism 16 and be completely contained within its associated tube between the gate 71 and the selection plates 22 before the next operation takes place. Also the re-engaged forward feed rollers are ready for the next or subsequent operation.

In FIG. 12 a diagrammatic circuit is disclosed to provide the necessary control for the operation of the mechanism illustrating the invention by way of example. Generally, the sequence of operation is to reset the system to insure that the forward feed rollers are in cooperation and that the gate 71 is conditioned for opening, then to address the system to select the desired wire 12.

An address is made by energizing the proper stop pin magnets 52 and 65 for positioning the related stop pins 48 and 50, the solenoids 39 and 45 for moving the separate row and column bails 37 and 40, and the solenoids 27 and 28 for moving the row and column selection plates, 21 and 22, respectively. At this same time, the proper magnet 167 is energized to open the associated valve 166 to position the feeding mechanism 16 together with the transducers 17, wire guides 151 and 183, sensing devices 184 and 189 and the gate 71 to the approximate mid-position of the row of groups of tubes 13 containing the addressed wire 12. Also at this time the magnets 177 are de-energized to permit release of the brake shoe 174. After a short time delay, the air control magnets 61 and 62 are operated to actuate the valve 54 to admit air to the plenum chamber 20. Simultaneously the magnets 72 and 73 are operated to open the gate 71. Under the conditions just mentioned, the selected wire 12 will be projected from its tube 11 by the blast of air under pressure acting through aligned passages provided by the selection plates 21 and 22, respectively. This action directs the forward end of the wire 12 against the periphery of one of the forward feed rolls to lead the wire into the bite between the forward feed rolls and consequently be fed toward the transducers 17. One of the wire guides 151 will guide the wire 12 to a particular trannsducer 17. As the wire passes the transducer 17, the information thereon is read in any suitable manner, namely, a voltage signal is induced in the transducer pickup coils, not shown. This voltage signal then may be amplified to be utilized in a suitable manner to represent the information recorded on the wire 12; and correspondingly other information may be recorded on the wire 12 when passing the transducer 17 by supplying the voltage representing the information to be recorded to write or recording coils, also not shown. The wire 12 passes the sensing device 184 immediately after it passes the transducer 17 and as it does so it causes a signal to be generated. This signal is used to turn Off or de-energize the stop pin magnets 52 and 65 to permit retraction of the stop pins 48 and 50, the solenoids 39 and 45 for allowing the bails 37 and 40 to be moved to a home position, the selected solenoids 27 and 28 to permit the associated selection plates 21 and 22 to be moved to a home position, respectively, and the selected magnet 167 to permit the related valve 166 to close. The air control magnets 61 and 62 are operated by a self-opening circuit to actuate the air supply valve 54 to relieve the air pressure in the plenum chamber 20. As the wire 12 continues forward past the transducer 17 and the first sensing device 184, its leading end encounters the second sensing device 189 at which time a signal will be generated to cause the upper return feed roller 93 to be moved into cooperation with the lower return feed roller 94 and to disengage the forward feed rollers 91 and 92. This action returns the extended portion of the wire 12 back into the tube 11 before the wire 12 leaves the tube 11.

As the wire 12 is returned to the tube 11, the forward end of the wire passes the first sensing device 184 for the second time, and as it does so, a signal is generated which after a suitable time delay, may be utilized to close the gate 71 to entrap the wire 12 in the tube 11, and again engage the forward feed rollers 91 and 92 so that the next selected wire 12 projected thereto will be fed in the forward direction. Although not shown, the sensing device 189 could be automatically positionable to preselected positions upon a given signal from an address thereby selectively determining the length of wire 12 that is fed out from the tube 11.

In the example shown, an address to the storage device could emanate from a computer or other like devices; however, for purposes of the invention, selector switches are used for making an address.

Specifically, in FIG. 12, the closing of a reset switch SW1 completes a circuit for energizing a holding relay R1 which remains energized upon release of the reset switch SW1 through its own contact points R1*a* and a manual stop switch SW2. Further the relay R1 closes contacts R1*b* for completing a circuit to a manual start switch SK; hence a wire 11 cannot be projected from a tube unless the operator first closes the reset switch SW1. The relay R1 also opens normally closed contact points R1*c*, R1*d*, and R1*e* to set up the proper condition for opening of the gate 71, engaging the forward feed rollers 91 and 92 and actuating of the air valve 54 to admit air under pressure to the plenum chamber 20. It is seen that the normally closed contact point R1*d* connected to the grid of a thyratron 191 fires the same and completes a circuit to operate the magnets 124 for holding the forward feed rollers 91 and 92 in engagement. The normally closed contact point R1*c* connected to the grid of a thyratron 192 fires the same to complete a circuit to the gate magnets 72 for holding the gate 71 in the closed or vertical position in order to condition the gate 71 for opening upon a thyratron 193 being rendered conductive. The normally closed contact point R1*e* operates through the grid of a thyratron 194 to fire the same and completes a circuit to the air control magnets 61 for holding the valve 54 in a position to maintain the plenum chamber 20 at atmospheric pressure.

Before closing the manual start switch SK, the address of the desired wire in the storage unit is selected. This address may be made by properly setting each of four rotary selector switches, 196, 197, 198 and 199, respectively. The switch 196 controls the operation of the row selection plate solenoids 27 for operating the row selection plates 21, the switch 197 controls the operation of the column selection plate solenoids 28 for operating the column selection plates 22, and the magnets 167 for operating the control valves 166 associated with the feed roll positioning mechanism 152, the switch 198 controls operation of the row stop pin magnets 52 and the switch 199 controls operation of the column stop pin magnets 65. Operation of the bail magnets 39 and 45 occurs automatically.

Hence to select a particular wire, for example, the wire at row position 21 and column position 14 as in FIG. 6, the selector switch 196 would be set to position one and the selector switch 197 would be set to position two, the selector switch 198 would be set to position nine and the selector switch 199 would be set to position four. The start switch SK is then closed, thereby providing a positive pulse or voltage over the line 201 to the grid of the thyratron 193 to fire the same and complete a circuit through the plate to energize the gate magnets 73 to open the gate 71. As the thyratron 193 is fired, the related thyratron 192 is extinguished by a negative pulse transmitted through a capacitor 202 which couples the plates of the thyratrons 192 and 193. Since contact R1*c* has been opened by the relay R1, the thyratron 192 remains extinguished and the magnets 72 are de-energized. At the same time, closing of the start switch SK provides a positive pulse over a line 203 to the control grids of thyratrons 204, 206, 207 and 208 whose plates are selectively connected to the wiper arm contacts of the rotary selector switches 196, 197, 198 and 199, respectively, to fire each thyratron. With the thyratrons 204, 206, 207 and 208 conducting the magnets 52 and 65 are energized to respectively position the stop pins 48 and 50 and the solenoids 27 and 28 are energized for moving the desired selection plates 21 and 22, respectively. Also since it is necessary to position the bails 37 and 40, the grid of a thyratron 209 is also connected to the line 203 to receive the same positive pulse as applied to the other said thyratrons, thereby causing the thyratron 209 to fire and in turn energize the parallel connected solenoids 39 and 45. Further, the magnets 167 for actuating the control valves 166 of the feed roll positioning mechanism 152 as stated are connected to the selector switch 197 which also controls the solenoids 28 for moving the column selection plates 22; hence as the particular solenoid 28 for moving a selected column selection plate 22 is energized, the selected magnet 167 is also energized for positioning the feeding mechanism 16 to the same row of groups of tubes 13 as that of the column selection plate 22. Moreover to permit movement of the feeding mechanism 16 the brake 174 is released by de-energizing the magnets 177 which are connected in the plate circuit of a thyratron 213 which had been conducting when the thyratron 206 was not conducting. The plate of the thyratron 206 is coupled to the plate of the thyratron 213 by a capacitor 219 and hence as the thyratron 206 fires the thyratron 213 extinguishes. With the selection plates 21 and 22 having been aligned to communicate the tube containing the selected wire with the plenum chamber 20, the gate 71 having been opened, the forward feed rollers 91 and 92 having been previously placed in cooperation, and the feeding mechanism 16 with its associated mechanism having been properly positioned, the air valve 54 may now be operated to admit air under pressure to the plenum chamber 20. The air valve 54 will be operated at this time, since as the switch SK was closed, the positive pulse was also supplied through a delay circuit TD of a type well known in the art and schematically shown in FIG. 14 to the grid of a thyratron 211, thereby rendering it conductive. Conduction of this tube 211 consequently causes the air control magnets 62 to become energized and the air control magnets 61 are de-energized by means of a capacitor coupled shot from the thyratron 194. Operation of the magnets 62 actuates the air valve 54 to admit air under pressure into the chamber 20. This action causes the selected wire 12 to be projected forward from its tube and enter between the forward feed rollers 91 and 92 which are engaged to feed the wire to one of the transducers 17. After passing the transducer 17, the forward end of wire 12 passes the first sensing device 184, thereby causing a positive pulse to be generated. This positive pulse is transmitted over a line 210 to the grid of a thyratron 212 coupled through a capacitor 218 to the thyratron 204, the thyratron 213 coupled to the thyratron 206, a thyratron 214 coupled through a capacitor 221 to the thyratron 207, a thyratron 216 coupled through a capacitor 222 to the thyratron 208, and a thyratron 217 coupled through a capacitor 223 to the thyratron 209, respectively, to initiate their conduction. Conduction of the thyratrons 212, 213, 214, 216 and 217 extinguish the thyratrons 204, 206, 207, 208 and 209, respectively, by means of negative pulses supplied to the plates of the related thyratrons through the coupling capacitors 218, 219, 221, 222 and 223, respectively, and thereby the solenoids 27, 28, 39 and 45 and the magnets 52 and 65 become de-energized and the magnets 177 become energized. The positive pulse from the sensing device 184 is also transmitted over a line 225 and a line 230. The line 225 transmits the positive pulse to the grid of the thyratron 194 to fire the same and thereby energize the air control magnets 61. As the thyratron 194 fires, the thyratron 211 coupled thereto through a capacitor 215 extinguishes and thus the air control magnets 62 become de-energized. This action operates the air valve 54 to relieve the plenum chamber 20 to the ambient atmosphere. The line 230 transmits the positive pulse to an inverter I of any suitable type and then to a delay circuit TD as in FIG. 14. The inverted or negative pulse is then transmitted from the delay circuit to the grids of the thyratron 191 and 192; however, the thyratron 191 continues to conduct and the thyratron 192 remains extinguished and therefore the magnets 73 and 91 remain energized to hold the gate 71 opened and the forward feed rolls 91 and 92 in engagement respectively. With the forward feed rolls still engaged the wire 12 continues to be fed past the transducer 17 and in doing so, it encounters the second sensing device 189 to cause a positive pulse to be generated. This positive pulse is transmitted over a line 224 to the grid of a thyratron 226 thereby causing the same to conduct. Conduction of the thyratron 226 completes the circuit to energize the return feed roll magnets 123 and extinguishes the related thyratron 191 through condenser 227 to de-energize the forward feed roll magnets 124 thereby engaging the return feed rollers 93 and 94 so that the wire 12 will be returned for storage into its related tube 11. On the way into the tube 11, the end of the wire 12 again passes the first sensing device 184; however, at this time a negative pulse is generated as the forward end of the wire 12 leaves the sensing device 184. The negative pulse is transmitted over the line 230 to the inverter I to be changed to a positive pulse and then transmitted through the delay circuit TD to the grids of thyratrons 191 and 192, respectively, to fire the same and extinguish thyratrons 226 and 193 to cause the gate 71 to close and the forward feed rolls 91 and 92 to re-engage.

The delay circuit in FIG. 14 consists of a single shot multivibrator 228 connected to a cathode follower 229. The single shot multivibrator 228 is essentially a two-stage resistance capacitance coupled amplifier with a tube 231 cut off and a tube 232 normally conducting. The grid of the cathode follower 229 is resistively coupled to the plate of the tube 231. The tube 232 is normally conducting since its grid is at cathode potential. With the tube 232 conducting the tube 231 is cut off by the voltage drop across a resistor 233 in the plate circuit of the tube 232. When a positive pulse is emitted from the inverter I, it raises the potential of the grid of the tube 231 above cutoff voltage; hence the tube 231 begins to conduct and as it does so, the plate potential decreases because of the drop across a resistor 234 in the plate circuit. Ths decreases the potential passed through a coupling capacitor 236 and appears as a negative going pulse at the grid of the tube 232, thereby rendering the tube 232 nonconductive. The tube 231 remains conductive until the capacitor 236 discharges sufficiently toward the lower value of the plate voltage of the tube 231 to allow the grid of the tube 232 to rise to render the tube 232 conductive. With the tube 232 conducting, the tube 231 is rendered nonconductive by the voltage dropping across the resistor 233. As the tube 231 becomes nonconductive, its plate voltage increases, and since the cathode follower 229 is connected across the load resistor 234, as the plate voltage increases, a positive going pulse will be emitted from the cathode follower 229 to the grid of the thyratrons 191 and 192, thereby causing them to conduct. As previously stated, when the thyratron 191 conducts, the circuit to the forward feed roll magnets 124 for engaging the cooperating feed rollers 91 and 92 so that a wire will be fed toward the transducer 17 is completed. The thyratron 226 for energizing the magnets 123 to engage the cooperating feed rollers 93 and 94 is extinguished by a negative pulse supplied to the plate of the thyratron 226 through the coupling capacitor 227 from the plate of the thyratron 191 as the thyratron 191 is rendered conductive and thereby the return feed roll magnets become de-energized. As the thyratron 192 conducts, the thyratron 193 is extinguished by the negative pulse transmitted from the plate of the thyratron 192 through the coupling capacitor 202 to the plate of the thyratron 193. With the thyratron 192 conductive the circuit for energizing the magnets 72 for closing the gate 71 is completed and the magnets 73 are de-energized as the thyratron 193 extinguished, thereby causing the gate 71 to close to entrap the wire 12 within the tube 11. With the wire 12 returned to lie within its associated tube 11 and the forward feed rolls re-engaged another selection may be made.

This represents a cycle of operation for the example given to illustrate the invention and further operation would be conducted in a similar or like manner. However, an address to the storage device could be automatic and could emanate from a computer or other like device.

From the foregoing it is seen that a data storage device of the random access type has been provided whereby access to the desired data is at a very rapid rate.

Also, it is seen that by freely supporting longitudinal record elements which are flexible in all planes transverse to the longitudinal axis, the record elements may easily be guided to the transducer and be moved relative thereto for a transducing operation.

Further, it is seen that the record elements of the storage device are easily replaceable when damaged.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A data storage device comprising a plurality of flexible elongated data bearing records each having two ends, means for freely supporting said elongated records along the length thereof in all planes transverse to the longitudinal axis, means located in a fixed position adjacent one of the ends of said records for transducing data with respect thereto, feeding means fixed intermediate said transducing means and said one of the ends of the records and adapted to receive while in the fixed position any one of the records and feed the same into cooperative relationship with said transducer for a transducing operation and subsequently return for support with at least a portion of said records remaining in contact with said supporting and said feeding means, and record advancing means having a selectively operable record advancing device associated with each record to advance the same to said feeding means.

2. A data storage device according to claim 1 wherein said elongated data bearing records comprise wires.

3. A data storage device according to claim 1 wherein said record supporting means comprise an independent tube for freely supporting each record.

4. A data storage device comprising a plurality of elongated data bearing records each having two ends, means for freely supporting said elongated records along the length thereof in all planes transverse to the longitudinal axis, a transducer located in a fixed position near one of the ends of the records for transducing data with respect to any of the records, feeding means located between said transducer and said one of the ends of the records for feeding a record to and from said transducer to permit the record to move into cooperative relationship with said transducer for a transducing operation and subsequently return for support with a portion of said records remaining in contact with said supporting and feeding means, a first guiding means for laterally guiding a record along a predetermined path to said transducer as the same is fed thereto, a second guiding means for guiding a record to return along said predetermined path as the record is returned for support, and a record advancing means located adjacent the other end of each record for selectively advancing the associated record from said supporting means to said feeding means.

5. A data storage device comprising a plurality of elongated data bearing records each having a forward and rearward end, means for freely supporting said elongated records along the length thereof in all planes transverse to the longitudinal axis, a transducer located near said forward end of the records for transducing data with respect to any of the records, feeding means located between said transducer and the said forward end of the records for feeding a record to and from said transducer to permit the record to move into cooperative relationship with said transducer for a transducing operation and subsequently return for support without leaving said supporting means, sensing means disposed a predetermined distance away from said transducer to sense the forward end of said records, said sensing means adapted to generate a signal upon sensing said forward end of the record, means for reversing the direction of operation of said record feeding means in response to signals generated by said sensing means, and means located adjacent said rearward end of the records for selectively advancing one of the records from said supporting means to said feeding means.

6. A data storage device comprising a plurality of elongated data bearing records each having a forward and rearward end, means for freely supporting said elongated records along the length thereof in all planes transverse to the longitudinal axis, a transducer located near said forward end of the records for transducing data with respect to any of the records, feeding means located between said transducer and said forward end of the records for translating a record to and from said transducer to permit the record to move into cooperative relationship with said transducer and subsequently return for support, first sensing means disposed a predetermined distance away from said transducer for sensing the forward end of said records, said first sensing means being adapted to generate a signal upon sensing said forward end, second sensing means disposed a predetermined distance away from said first sensing means for sensing the forward end of said records, said second sensing means being adapted to generate a signal upon sensing said forward end, record advancing means located adjacent said rearward end of said records for selectively advancing one of the records from said supporting means to said feeding means, and means for controlling the operation of said record advancing means in response to signals generated by said first and second sensing means.

7. A data storage device comprising a plurality of elongated data bearing records each having two ends, means for freely supporting said elongated records along the length thereof, a transducer located near one of the ends of the records for transducing data with respect to any of the records, feeding means located between said transducer and the said one of the ends of the records for feeding a record to and from said transducer to permit the record to move into cooperative relationship with said transducer and subsequently return for support without leaving said supporting means, shutter means located between said one of the ends of the records and said feeding means for selectively restricting movement of said records from said supporting means, record advancing means located adjacent the other ends of the records for selectively advancing one of the records from said supporting means to said feeding means, and means operatively connected to control operation of said record advancing means and to control said operation of said shutter means.

8. A data storage device according to claim 7 wherein said plurality of elongated data bearing records comprise wires.

9. A data storage device according to claim 7 wherein said means for freely supporting said elongated records comprise a related tube for containing one of the elongated records respectively.

10. A data storage device comprising a plurality of elongated elements for recording data thereon, and each having two ends, means for freely supporting said elongated elements along the length thereof, means located in proximity of one of the ends of said elongated elements for transducing data with respect to any of said elements, feeding means located between said transducing means and said one of the ends of the elongated elements for translating elements to and from said transducing means to permit the elongated elements to move into cooperative relationship with said transducer and subsequently return for support, and selectively operable means located adjacent the other of the ends of said elongated elements for directing fluid under pressure to act upon one of said elongated elements to selectively advance the same along said supporting means to said feeding means.

11. A data storage device comprising a plurality of elongated wires each having opposite ends and adapted to have coded data magnetically recorded along the length thereof, a plurality of open-ended tubes each freely containing an associated elongated wire and arranged in a predetermined number of equal groups disposed in uniformly spaced rows and columns, a transducer for reading and writing coded data along the length of said wires located near one end of the ends of said tubes and positionable to approximately the mid-position of each row of groups of tubes, wire feeding means located between said transducer and the end of the ends of the tubes near said transducer for feeding wires toward and away from said transducer and being positionable with said transducer, means located between said transducer and said wire feeding means for guiding a wire fed into cooperative relationship with said transducer for a transducing operation, means operable located adjacent the other end of the ends of said tubes for selectively advancing one of the wires from an associated tube to said wire feeding means, gate means located adjacent said one end of the ends of the tubes for exposing and covering the openings of said one end of the ends of a row of groups of tubes and being positionable with said transducer, said gate means being operable to expose said openings when a wire is to be advanced to said wire feeding means and to cover the openings after returning the wire within the tube for containing the same, a first sensing means positionable with said transducer and located a predetermined distance from said end of the ends of the tubes near the transducer and adapted to generate a signal upon detection of the presence of the end of a wire fed therepast to cause the wire feeding means to return said wire to lie within the tube for containing the same, a second sensing means positionable with said transducer and located between said first sensing means and said one end of the ends of the tubes adapted to generate a signal upon detection of the absence of the end of a wire fed therepast upon return of the wire to the tube for containing the same to cause said gate means to cover said openings and means for positioning said transducer to approximately the mid-position of the row of groups of tubes containing the selected wire to be advanced from the associated tube.

12. A data storage device according to claim 11 wherein said second sensing means uponn detection of the absence of the returning wire end generates a signal to cause said wire feeding means and transducer to position at approximately to the mid-position of the row of groups of tubes containing said selected wire and cause another one of the wires to be advanced to the positioned wire feeding means.

13. A data storage device according to claim 11 wherein said means for selectively advancing a wire from an associated tube to said wire feeding means comprises a source of fluid under pressure, a chamber connected to said source of fluid pressure, means for controlling passage of fluid from said source to said chamber, a matrix means located between said chamber and the other end of the ends of the tubes and selectably shiftable to form a passage to communicate said fluid from said chamber to any particular tube opening to the exclusion of all other tube openings, and means to shift said matrix means in a predetermined manner to form said passage for the fluid to said particular tube opening.

14. In a data storage device, a plurality of elongated flexible record elements for bearing data, support means for freely supporting each record element in all planes transverse to the longitudinal axis thereof, transducing means fixedly positioned relative to said record elements, a plurality of first feeding means, each first feeding means being associated with one of said record elements and selectively operable to move the associated record element relative to said supporting means, and second feeding means adapted to receive any record element moved relative to said supporting means by any of said first feeding means and move the received record element into cooperative relationship with said transducing means for a transducing operation.

15. In a data storage device according to claim 14 wherein said second feeding means is operable to return the record fed thereby for support after the transducing operation takes place.

16. In a data storage device according to claim 15 further comprising means for controlling said second feeding means in a manner whereby a portion of the fed record element remains in contact with said support means to facilitate the return thereto after the transducing operation takes place.

17. A data storage device comprising a group of elongated tubular elements open at each end; a flexible elongated data bearing record element freely contained within each of said tubular elements; bidirectional feeding means fixed adjacent one of the ends of said tubular elements operably controlled for feeding the record elements, said feeding means being fixed in position to receive any record element projected from any of the tubular elements; means for controlling the operation of said feeding means; transducing means disposed relative to said feeding means to receive record elements fed thereby to perform a transducing operation with respect thereto; and a record projecting device disposed adjacent the other end of each tubular element, said record projecting device being selectively operable to project the associated record element from the containing tubular element to said feeding means.

18. A data storage device comprising a single row of elongated tubular elements open at each end, a flexible elongated record element for bearing data freely contained within each elongated tubular element, a transducer fixedly located to receive any of said record elements for performing a transducing operation relative thereto, and selectively operable means associated with each record element for bringing the same to said transducer for a transducing operation.

19. In a data storage device, a plurality of elongated tubular elements arranged in rows and columns, said tubular elements being open at each end; an elongated record element contained within each tubular element; a row selection plate slidably disposed relative to one end of said tubular elements, said row selection plate having a series of openings therein arranged in a column to correspond to the number of rows of tubular elements; means for normally biasing said row selection plate in a home position whereby said openings therein are maintained out of alignment with any column of tubular elements; means for selectively positioning said row selection plate whereby said openings therein are aligned with a preselected column of tubular elements; a column selection plate slidably disposed relative to said row selection plate, said column selection plate having a series of openings therein arranged in a row to correspond to the number of columns of tubular elements; means for normally biasing said column selection plate in a home position whereby said openings therein are maintained out of alignment with any row of tubular elements; means for selectively positioning said column selection plate whereby said openings therein are aligned with a preselected row of tubular elements whereby one of the tubular elements becomes aligned with an opening in both said row selection plate and said column selection plate; a plenum chamber disposed adjacent to said column selection plate to supply fluid under pressure, said fluid under pressure being conducted to said one of the tubular elements to displace the record element therefrom; bidirectional feeding means fixedly positioned adjacent the other end of said tubular elements so as to receive any record element projected from any one of the tubular elements as fluid under pressure is conducted upon positioning of said column and row selection plates to a selected one of said tubular elements to displace the record element therefrom; transducing means disposed in a fixed position relative to said feeding means to receive record elements fed thereby to perform a transducing operation with respect thereto; and means for controlling the operation of said feeding means in a manner that said feeding means feeds a record element displaced by fluid under pressure relative to said transducing means to enable the same to perform a transducing operation and thereafter return said fed record element to its associated tubular element to again be freely contained therewithin.

20. In a data storage device according to claim 19 further comprising a first set of selectively operable stop pins normally disposed out of and adapted to enter the path of movement of said row selection plate so as to limit the movement thereof, and a second series of selectively operable stop pins normally disposed out of and adapted to be moved into the path of movement of said column selection plate so as to limit the movement thereof.

21. In a data storage device, a plurality of groups of elongated tubular elements, the tubular elements in each group being arranged in rows and columns, said tubular elements being open at each end; supporting means for supporting said groups of tubular elements in rows and columns with a predetermined space between adjacent groups; an elongated record element freely contained within each tubular element and adapted to be moved relative thereto along the length thereof; a row selection plate for each row of groups of tubular elements slidably disposed adjacent one end of the tubular elements, said row selection plate having for each group of tubular elements in the associated row of groups of tubular elements a series of transversely spaced openings corresponding in number to the number of rows of tubular elements in the group; means for biasing each row selection plate in a home position so that the openings therein align with said space between adjacent groups of tubular elements in the associated row; a column selection plate for each column of groups of tubular elements slidably disposed adjacent said row selection plates, said column selection plate having for each group of tubular elements in the associated column of groups of tubular elements a series of transversely spaced openings corresponding in number to the number of columns of tubular elements in the group; means for biasing each column selection plate in a home position so that the openings therein align with said space between adjacent groups of tubular elements in the associated column; selectively operable means associated with each row selection plate for moving the same, whereby the openings therein for a predetermined group of tubular elements align with a preselected column of tubular elements in said predetermined group; selectively operable means associated with each column selection plate for moving the same, whereby the openings therein for a predetermined group of tubular elements align with a preselected row of tubular elements in said predetermined group; a plenum chamber disposed adjacent to said column selection plates to supply fluid under pressure; bidirectional feeding means selectively positionable adjacent the other end of any row of groups of tubular elements so as to receive any record element projected from any one of the tubular elements of a group in the particular row to which said feeding means is positioned; transducing means positionable with said bidirectional feeding means to receive record elements fed thereby to perform a transducing operation with respect thereto; and means for controlling the operation of said feeding means in the manner that said feeding means feeds a record element displaced by fluid under pressure relative to said transducing means to enable the same to perform a transducing operation and thereafter return said record element to its associated tubular element.

22. In a data storage device as in claim 21 further comprising means for actuating said selectively operable means associated with a predetermined row selection plate, whereby the same is caused to move to a position so that the openings therein for a predetermined group of tubular elements of the groups of tubular elements associated with the predetermined row selection plate align with a preselected column of tubular elements in said predetermined group; and means for actuating said selectively operable means associated with a predetermined column selection plate, whereby the same is caused to move to a position so that the openings therein for a predetermined group of tubular elements of the groups of tubular elements associated with the predetermined column selection plate align with a preselected row of tubular elements in said predetermined group, whereby one of the openings in said predetermined row selection plate is aligned with one of the openings in the predetermined column selection plate.

23. In a data storage device according to claim 21 wherein each row selection plate is provided with an elongated aperture, each column selection plate is provided with an elongated aperture, and further comprising a selectively positionable stop pin projecting through said aperture in each row selection plate for limiting the movement of the associated row selection plate, and a selectively positionable pin projecting through said aperture in each column selection plate for limiting the movement of the associated column selection plate.

24. In a data storage device according to claim 23 wherein said selectively positionable stop pins projecting through the apertures in said row selection plates are connected to a common member so as to be simultaneously positioned at a predetermined position relative to said apertures upon positioning said common member.

25. In a data storage device according to claim 24 further comprising positioning means for selectively positioning said common member.

26. In a data storage device according to claim 25 wherein said positioning means comprises a slide block; a slide bar slidably disposed relative to said slide block, said slide bar having a plurality of spaced teeth projecting therefrom; and a plurality of selectively movable stop pins adapted to be positioned to engage in an abutting relationship one of said teeth upon movement of said slide bar so as to limit the travel thereof.

27. In a data storage device as in claim 26 wherein said teeth are of different widths and said plurality of selectively movable stop pins are equally spaced from each other.

28. In a data storage device as in claim 27 wherein said stop pins are slidably disposed in said slide block.

29. In a data storage device as in claim 28 wherein teeth project from opposite sides of said slide bar in a staggered relationship.

30. In a data storage device as in claim 29 further comprising magnetic means selectively operable for moving said slide bar relative to said slide block.

31. In a data storage device as in claim 30 further comprising selectively operable magnetic means associated with each stop pin to selectively move the same into position for engaging one of the teeth projecting from said slide bar.

32. In a data storage device as in claim 21 wherein said bidirectional feeding means comprises a first pair of feed rolls movable relative to each other into and out of a cooperative feeding relationship for feeding the record elements in one direction relative to said tubular elements, and a second pair of feed rolls movable relative to each other into and out of a cooperative feeding relationship for feeding the record elements in a direction opposite to said one direction.

33. In a data storage device according to claim 32 further comprising feed roll control means selectively operable for simultaneously moving said first pair of feed rolls into cooperative feeding relationship and said second pair of feed rolls out of a cooperative feeding relationship.

34. In a data storage device according to claim 33 further comprising selectively operable magnetic means for selectively operating said feed roll control means.

35. In a data storage device according to claim 34 further comprising means for driving said first and second pair of feed rolls continuously at a predetermined angular velocity.

36. In a data storage device according to claim 21 further comprising positioning means for selectively positioning said bidirectional feeding means to a position to be associated with any row of groups of tubular elements.

37. In a data storage device according to claim 36 wherein said positioning means comprises selectively operable pneumatic means.

38. In a data storage device according to claim 37 further comprising a magnetically operable detent means for detenting said positioning means upon the same having positioned said bidirectional feeding means.

39. In a data storage device according to claim 38 further comprising selectively operable shutter means disposed between said bidirectional feeding means and said other end of said groups of tubular elements, said shutter means being operable to prevent escape of said record elements from said tubular elements.

40. In a data storage device as in claim 39 wherein selectively operable magnetic means operates said shutter means to prevent escape of record elements from said tubular elements.

41. In a data storage device as in claim 40 wherein said shutter means is fixed in line with said bidirectional feeding means and positionable therewith to be associated with any row of groups of tubular elements.

42. In a data storage device according to claim 41 further comprising bell-shaped guiding means for guiding record elements from said bidirectional feeding means to said transducing means.

43. In a data storage device according to claim 42 wherein said transducing means and said guiding means are positionable with said bidirectional feeding means to be associated with any row of groups of tubular elements.

44. In a data storage device according to claim 43 wherein secondary guiding means are fixed to said bell-shaped guiding means to control lateral movement of the record elements relative to said bidirectional feeding means.

References Cited in the file of this patent

UNITED STATES PATENTS

| | | |
|---|---|---|
| 986,020 | Mills | Mar. 7, 1911 |
| 2,650,830 | Potter | Sept. 1, 1953 |
| 2,652,196 | Sterling | Sept. 15, 1953 |
| 2,671,700 | Seyffert | Mar. 9, 1954 |
| 2,674,728 | Potter | Apr. 6, 1954 |
| 2,680,052 | Delf | June 1, 1954 |
| 2,690,913 | Rabinow | Oct. 5, 1954 |
| 2,698,699 | Skillman | Jan. 4, 1955 |
| 2,712,624 | Beattie | July 5, 1955 |
| 2,782,398 | West et al. | Feb. 19, 1957 |
| 2,819,940 | Sorrells | Jan. 14, 1958 |
| 2,842,754 | Luhn | July 8, 1958 |
| 2,852,761 | Hagopian | Sept. 16, 1958 |
| 2,883,475 | Ridler et al. | Apr. 21, 1959 |
| 2,918,656 | Nolde et al. | Dec. 22, 1959 |

OTHER REFERENCES

"Apparatus for Magnetic Storage on Three Inch Wide Tapes" (Lawrence et al.), Proceedings of the Eastern Joint Computing Conferences, pages 84–89, Dec. 10, 12, 1956.

Disclaimer 3,107,346.—*Daniel P. Darwin*, Endicott, and *Donald K. Rex* and *Robert M. Kellogg*, Binghamton, N.Y. DATA STORAGE APPARATUS. Patent dated Oct. 15, 1963. Disclaimer filed Jan. 10, 1966, by the assignee, *International Business Machines Corporation.*

Hereby enters this disclaimer to claim 1 of said patent.

[*Official Gazette May 24, 1966.*]